(12) United States Patent
Alcorn et al.

(10) Patent No.: US 9,928,724 B2
(45) Date of Patent: Mar. 27, 2018

(54) FLOW CHARACTERISTIC DETECTION AND AUTOMATIC FLOW SHUTOFF

(71) Applicant: RACHIO, INC., Denver, CO (US)

(72) Inventors: Bradley Wilson Alcorn, Denver, CO (US); Franz David Garsombke, Golden, CO (US); Eric Lester Miles, Castle Rock, CO (US); Christopher Michael Klein, Denver, CO (US)

(73) Assignee: Rachio, Inc., Denver, CO (US)

( * ) Notice: Subject to any disclaimer, the term of this patent is extended or adjusted under 35 U.S.C. 154(b) by 0 days.

(21) Appl. No.: 15/153,115

(22) Filed: May 12, 2016

(65) Prior Publication Data

US 2016/0335875 A1    Nov. 17, 2016

Related U.S. Application Data

(60) Provisional application No. 62/161,105, filed on May 13, 2015.

(51) Int. Cl.

| G08B 21/00 | (2006.01) |
|---|---|
| G08B 21/20 | (2006.01) |
| D06F 39/08 | (2006.01) |
| E03B 7/07 | (2006.01) |
| G01F 1/34 | (2006.01) |
| G01F 1/68 | (2006.01) |

(Continued)

(52) U.S. Cl.
CPC ........... *G08B 21/20* (2013.01); *D06F 39/081* (2013.01); *E03B 7/071* (2013.01); *G01F 1/34* (2013.01); *G01F 1/68* (2013.01); *G06Q 50/06* (2013.01); *G08B 21/182* (2013.01)

(58) Field of Classification Search
CPC .................................. G01F 1/00; G01M 1/00
See application file for complete search history.

(56) References Cited

U.S. PATENT DOCUMENTS

| 5,639,972 A | 6/1997 | Hastings et al. |
| 5,971,011 A | 10/1999 | Price |
| 6,390,999 B1 | 5/2002 | Zscheile et al. |

(Continued)

FOREIGN PATENT DOCUMENTS

| CA | 2631285 A1 | 11/2008 |
| WO | 2014178920 A2 | 11/2014 |
| WO | 2014203246 A2 | 12/2014 |

OTHER PUBLICATIONS

International Search Report and Written Opinion of International Patent Application No. PCT/US2016/032521, dated Sep. 16, 2016 (13 pages).

*Primary Examiner* — Shirley Lu
(74) *Attorney, Agent, or Firm* — Dorsey & Whitney LLP

(57) ABSTRACT

The present disclosure relates generally to a flow detection system. The system may include a flow detection hub fluidly connected to a fluid supply pipe including a flow sensor that detects a flow rate of fluid flowing through the fluid supply pipe and a processing element in communication with the flow sensor and a user device. The processing element performs the following operations: determining a first delta based on a first flow rate data from the flow sensor; determining a second delta based on a second flow rate data from the flow sensor; correlating the first delta and the second delta to a first event; and transmitting a message to a user device corresponding to the first event.

18 Claims, 22 Drawing Sheets

(51) Int. Cl.
   *G06Q 50/06* (2012.01)
   *G08B 21/18* (2006.01)

(56) References Cited

U.S. PATENT DOCUMENTS

| | | |
|---|---|---|
| 6,397,683 B1 | 6/2002 | Hagenmeyer et al. |
| 6,782,761 B2 | 8/2004 | Imai et al. |
| 7,117,104 B2 | 10/2006 | Urdaneta et al. |
| 7,315,257 B2 | 1/2008 | Patterson et al. |
| D662,432 S | 6/2012 | Leaders et al. |
| 8,347,427 B2 | 1/2013 | Klicpera |
| 8,489,342 B2 | 7/2013 | Dugger et al. |
| 8,939,016 B2 | 1/2015 | Brasel et al. |
| 2002/0148515 A1 | 10/2002 | Coffey et al. |
| 2006/0009928 A1 | 1/2006 | Addink et al. |
| 2006/0137090 A1 | 6/2006 | Jeffries et al. |
| 2008/0150750 A1 | 6/2008 | Parris et al. |
| 2008/0177678 A1 | 7/2008 | Di Martini et al. |
| 2008/0224892 A1 | 9/2008 | Bogolea et al. |
| 2009/0194719 A1 | 8/2009 | Mulligan |
| 2010/0204839 A1 | 8/2010 | Behm et al. |
| 2010/0313958 A1 | 12/2010 | Patel et al. |
| 2011/0050395 A1 | 3/2011 | Ervin |
| 2011/0074601 A1 | 3/2011 | Cornwall |
| 2011/0303310 A1 | 12/2011 | Klicpera |
| 2011/0303311 A1* | 12/2011 | Klicpera ............... B05B 12/008 137/551 |
| 2012/0173169 A1 | 7/2012 | Skelding |
| 2013/0080081 A1 | 3/2013 | Dugger et al. |
| 2013/0291974 A1* | 11/2013 | Bourgeois ................ F17D 5/02 137/625.3 |
| 2014/0183386 A1 | 7/2014 | Ravid et al. |
| 2014/0225745 A1 | 8/2014 | Lakhdari |
| 2014/0366612 A1 | 12/2014 | Horne et al. |
| 2015/0013772 A1 | 1/2015 | Patel et al. |
| 2015/0160059 A1 | 6/2015 | Le Floch |

\* cited by examiner

US 9,928,724 B2

FLOW CHARACTERISTIC DETECTION AND AUTOMATIC FLOW SHUTOFF

CROSS REFERENCE TO RELATED APPLICATIONS

The present application claims priority under 35 U.S.C. § 120 to U.S. Provisional Application No. 61/161,105 entitled "Detection of Flow Characteristics and Automatic Flow Shutoff," which is hereby incorporated by reference in its entirety.

FIELD

The present disclosure relates generally to the detection of flow characteristics of fluid flow in a water system, such as in one or more buildings, as well as automatic flow shut off of a fluid source.

BACKGROUND

Water damage—due to damaged water pipes, leaks, or the like—is one of the most common insurance claims and typically results in thousands of dollars in damage to a property. Often, property owners may be unware that pipe has burst or a leak has occurred until many gallons of water already have leaked into the property and caused both structural and property damage, as well as an expensive water bill.

Additionally, many property owners are unaware of how much water they use on a daily or monthly basis, such as the water usage of particular water devices (e.g., toilets, sinks, shower heads, etc.).

The present disclosure provides a system for detecting flow characteristics for early detection of leaks and other non-desired flow events, as well as providing data to users regarding flow characteristics and usage patterns.

SUMMARY

In one embodiment, a flow detection system is disclosed. The system may include a flow detection hub fluidly connected to a fluid supply pipe including a flow sensor that detects a flow rate of fluid flowing through the fluid supply pipe and a processing element in communication with the flow sensor and a user device. The processing element performs the following operations: determining a first delta based on a first flow rate data from the flow sensor; determining a second delta based on a second flow rate data from the flow sensor; correlating the first delta and the second delta to a first event; and transmitting a message to a user device corresponding to the first event.

In another embodiment, a method for detecting flow events in a fluid supply system is disclosed. The method includes detecting by a flow detection hub a first change in flow rate through a fluid supply pipe; detecting by a flow detection hub a second change in flow rate through the fluid supply pipe; using one or more flow characteristics of the flow rate through the fluid supply pipe to determining by a processing element that the first change and the second change correspond to one event; and correlating by the processing element the one event with one or more fluid devices in fluid communication with the fluid supply pipe.

In yet another embodiment, a flow detection system for a fluid supply system is disclosed. The flow detection system includes a flow sensor configured to detect flow characteristics of flow through the fluid supply system; a processing element in communication with the flow sensor; and a valve assembly in communication with the processor element and configured to prevent flow through the fluid system, wherein based on the detected flow characteristics the processing element selectively actuates the valve assembly.

SPECIFICATION

Overview

In some embodiments herein, a detection system for flow characteristics is disclosed. The detection system senses various characteristics of flow through a water system, such as water usage in a home or commercial property. In addition to detecting various characteristics, the detection system may also modify water flow in the system, such as shutting of a main source of water flow or flow to one more devices, as well as communicating flow and system data to one or more user devices.

The detection system may include a flow detection hub, one or more peripheral or fluid source sensors, a communication network, and one or more computing devices in communication with the flow detection hub. The flow detection hub detects fluid characteristics of fluid flow within a fluid system using one or more integral or main flow sensors, as well as a water quality sensor, one or more pressure sensors, one or more temperature sensors, one or more leak detectors, and one or more water source sensors. Using the detected fluid characteristics, the flow detection hub can determine whether a flow event, such as a leak or break, has occurred, as well as determining typical usage patterns and deviations from those patterns. The fluid characteristics and usage patterns can be transmitted to one or more user devices to alert users to leaks, breaks, as well as variations in typical usage. This allows users to be notified quickly when a leak or break occurs, as well as allows users to better and more easily monitor water usage within the system.

In many embodiments, the flow detection hub may be used without external flow sensors to detect changes in the flow characteristics. In these embodiments, the flow detection hub may detect deltas to the flow pattern and correspond deltas to flow events, which may then be tied to certain devices, leaks, abnormal use or the like. Depending on the type of flow events, the flow detection hub and system may then provide specific alerts to a user and also allow the user to monitor the water usage of the system as desired.

Flow Detection System

Figure 1A:
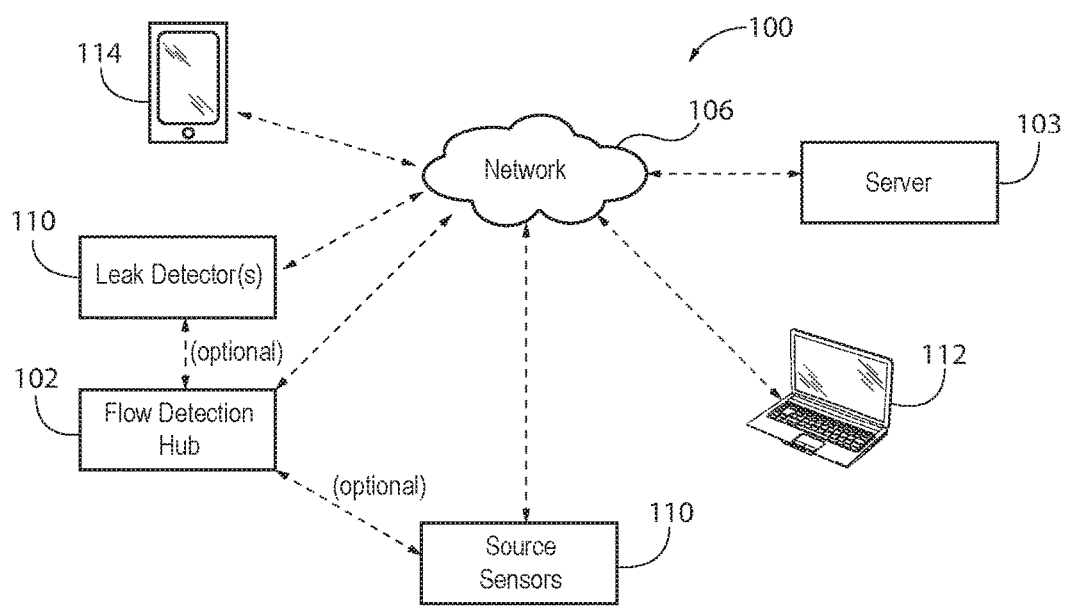
FIG. 1A is a block diagram of a flow detection system including a flow detection hub.
Figure 1B:
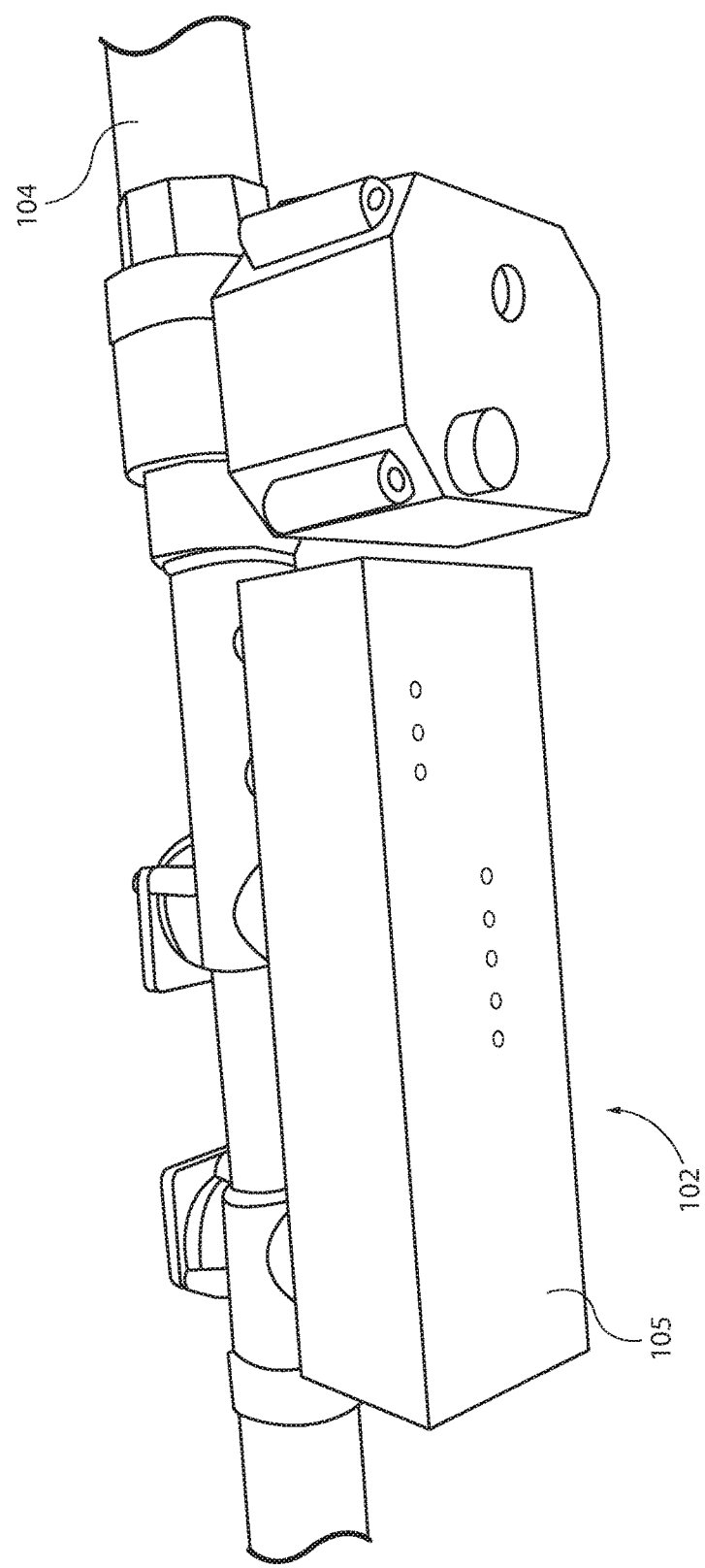
FIG. 1B is a top perspective view of the flow detection hub configured to be in fluid communication with a fluid supply pipe for a water system, such as a residential building.
Figure 1C:
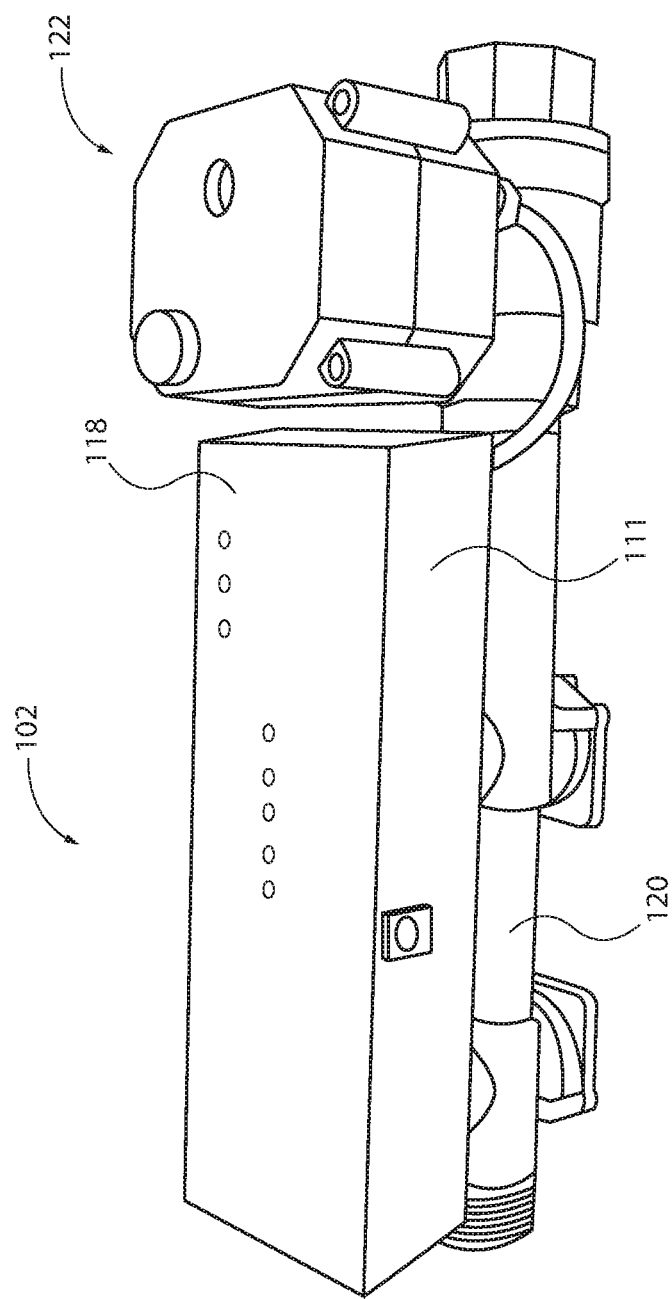
FIG. 1C is a front perspective view of the flow detection of FIG. 1B.

Turning now to the figures, the flow detection system will now be discussed in more detail. FIG. 1A is a block diagram of a flow detection system 100. FIG. 1B is a perspective view of a flow detection hub 102 configured to be connected to a water supply pipe 104 for the flow detection system 100. FIG. 1C is a perspective view of the flow detection hub 102. With reference to FIGS. 1A-1C, the flow detection system 100 may include the flow detection hub 102, and optionally one more peripheral sensing devices, such as one or more leak detectors 108, and one or more water source sensors 110. It should be noted that in some embodiments the sensing devices 108, 110 may be omitted.

The flow detection hub 102 detects flow characteristics of flow through a fluid system (e.g., house, condo, etc.), as well as flow data from one or more fluid sources (e.g., toilet, dishwasher, showerhead, sink, hose, etc.) via the leak detectors 108 and/or fluid source sensors 110. The flow detection hub 102 then communicates flow characteristic and fluid system data to the user devices 112, 114 through the network 106. In some embodiments, the flow detection hub 102 may also communicate with one or more servers 103 that then transfer data to the user devices 112, 114 (see, e.g., FIG. 12). This allows users to receive alerts, notifications, and other data regarding the water system.

The leak detectors 108 and fluid source sensors 110 may be substantially any type of sensors for detecting fluid flow into and/or out of a device. For example, the leak detectors 108 and/or fluid source sensors 110 may detect vibrations in a fluid supply pipe into a device to detect flow into the device, such as by connecting around or to a pipe. As another example, the leak detectors 108 and fluid source sensors 110 may be conductivity sensors to detect standing water, temperature sensors, or the like.

The leak detectors 108 and fluid source sensors 110 are typically positioned at various locations in the fluid system. For example, the leak detectors 108 and/or fluid source sensors 110 may be positioned near individual water fixtures, such as a kitchen sink, toilet, showerhead, or the like. The peripheral sensing functionality provided by the leak detectors 108 and water source sensors 110 allows the detection system 100 to more accurately detect flow within the system, identify leak locations and devices quickly, and provide more accurate monitoring of water usage in the system. The leak detectors 108 and fluid source sensors 110 may communicate directly with the flow detection hub 102 or may communicate via the network 106 with the flow detection hub 102.

In some embodiments, the leak detectors 108 and/or fluid source sensors 110 may be omitted and the flow detection hub 102 may be used alone to detect flow characteristics in the main system by detecting changes in fluid flow characteristics though the main water pipe 104, discussed in more detail below.

With reference again to FIG. 1A, the flow detection system 100 also includes a network 106, such as WiFi, Bluetooth, or other radio wave based system, and one or more user devices 112, 114. The user devices 112, 114 may be substantially any type of computing device, such as, but not limited to, a computer, a laptop, a tablet, a smart phone, a wearable device, or the like. The user devices 112, 114 may also be one or more smart home accessories, such as, cameras (e.g., live or still image cameras), smart thermostats, alarm systems, locking devices, or the like.

Additionally, although two user devices 112, 114 are illustrated, the system 100 may include fewer or more user devices 112, 114. Similarly, the user devices 112, 114 may be configured to receive different data from one another. For example, one user device 112 may be tied to a homeowner account and a second user device 114 may be tied to a service account to allow professionals (e.g., plumber) to view and access data regarding the user account. The type of data visible to each of the user devices 112, 114 may be varied, such that a homeowner account may have more access than a service account.

The server 103 may be one or more computing devices in communication with one another that are capable of storing data on one or more memory components and transmitting data between the various devices in the system 100. The server 103 may also be used to execute a number of algorithms and operations to generate event patterns, leak detection, and the like. This allows the flow detection hub 102 to be simplified in terms of processing power and the like.

Flow Detection Hub

Figure 2:
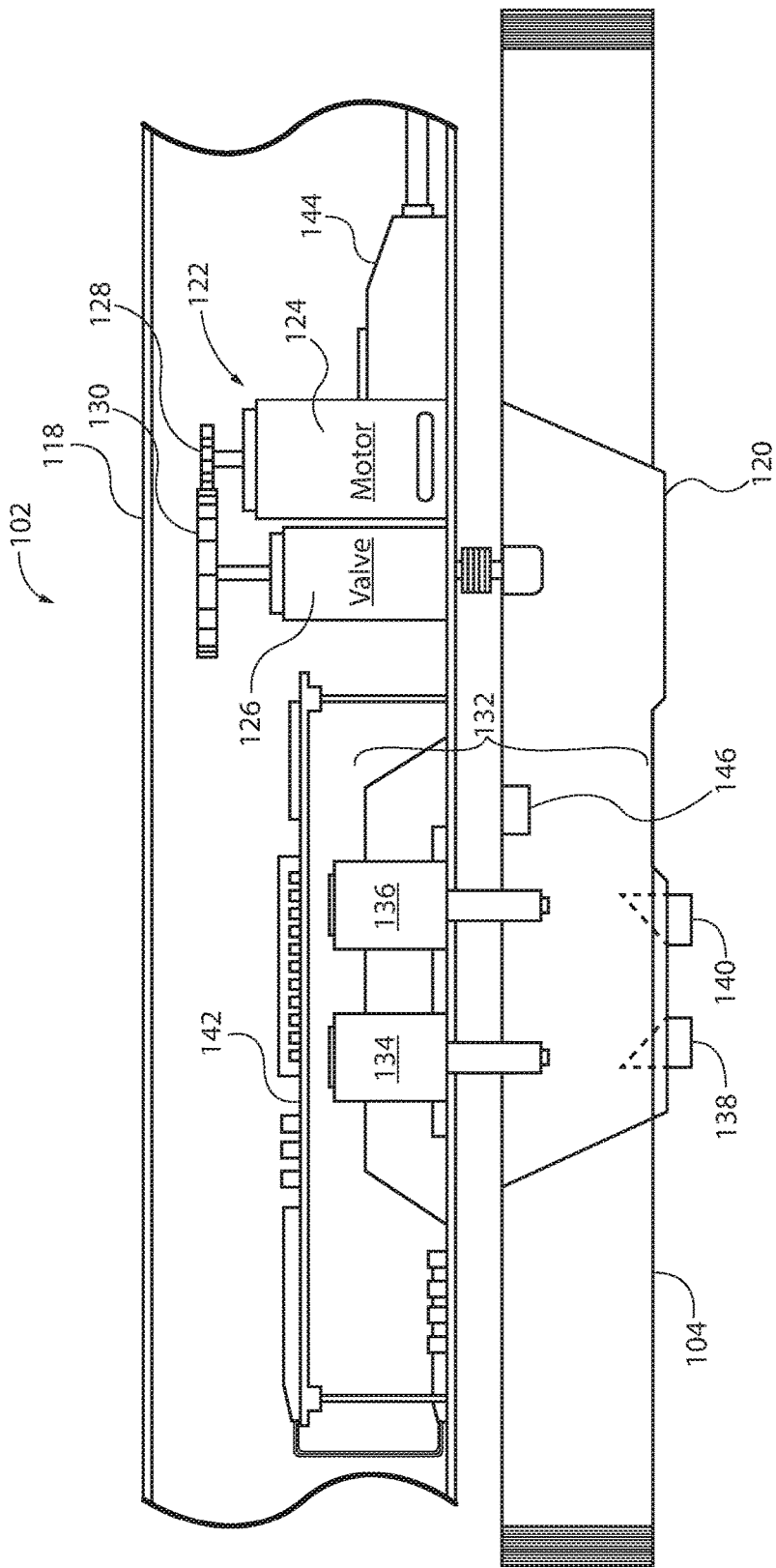
FIG. 2 is a partial cutaway view of a first example of a flow detection hub installed on the fluid supply pipe.
Figure 3:
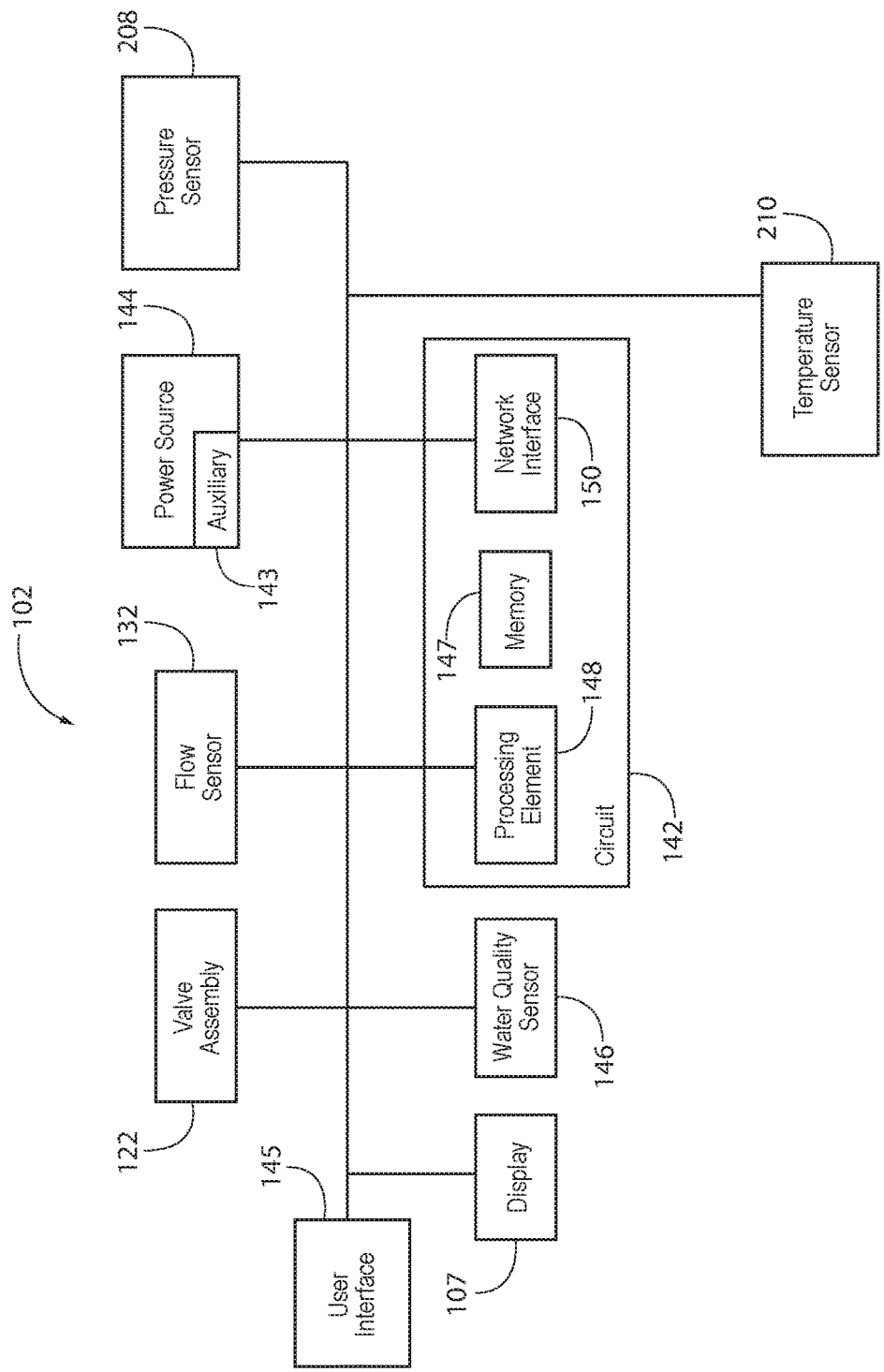
FIG. 3 is a simplified block diagram of the flow detection hub.

The flow detection hub 102 will now be discussed in more detail. FIG. 2 is a partial cutaway view of a first example of a flow detection hub 102 installed on the fluid supply pipe 104. FIG. 3 is a simplified block diagram of the flow detection hub 102. The flow detection hub 102 includes a hub pipe 120 that fluidly connects to the fluid supply pipe 104 and acts to support the flow detection hub 102 on the fluid supply pipe 104. With reference to FIGS. 2 and 3, the flow detection hub 102 includes a housing 118, a valve assembly 122, a flow sensor 122, a power source 144, a circuit 142, a user interface 145, and optionally a fluid quality sensor 146, pressure sensor 208, temperature sensor 210, each of the components will be discussed in turn below.

The housing 118 houses the various components of the flow detection hub 102 and protects the components from damage. The housing 118 may be sealed to prevent fluids from the fluid supply pipe 104 from entering into the housing 118 and damaging the components. The housing 118 also may be designed to be aesthetically pleasing. The housing 118 may optionally include a removable cover 111 that fits over or otherwise attaches to a base 113 (see FIG. 1C). In some embodiments, the removable cover 111 is configured to fit over the entire flow detection hub 102 and cover the valve assembly 122, as well as the remaining housing 118. In these embodiments, certain elements, such as user input buttons, the valve assembly 122 a display screen, or the like, may be concealed by the cover 111 during typical operation. This helps to prevent certain inputs from being inadvertently entered, as well as provide a simplified and elegant appearance for the device.

The valve assembly 122 includes a motor 124 and a valve 126 connected together via one or more gears 128, 130. The valve 126 is actuated by the motor 124 to selectively allow or prevent fluid from flowing past the valve 126 in the fluid supply pipe 104. The valve 126 may be substantially any type of valve device, but in some embodiments is a ball valve that pivots a ball 90 degrees within the hub pipe 120 to prevent fluid from flowing past the valve.

The motor 124 is connected to the power source 144 and circuit 142 to be selectively activated in order to move the valve 126 from an open position to a closed position. The ratio of the gears 128, 130 is selected in order to reduce rotational speed output by the motor 124 to increase the torque applied to the valve 126. The configuration of the gears 128, 130 and motor 124 may be varied based on the type of valve device used, as well as the volume of flow through the fluid supply pipe 104.

Although the valve assembly 122 is discussed as being electronically activated, in some embodiments, the valve assembly 122 also includes a manual activation to allow a user to manually open and close the valve 126. This feature allows a user to open or close the valve 126 in the event there is a power loss.

With continued reference to FIGS. 2 and 3, circuit 142 includes components for controlling the flow detection hub 102. For example, the circuit 142 may include one or more processing elements 148, memory component(s) 147, and/or a network interface 150. The processing element 148 is in communication with the valve assembly 122, the flow sensor 132, the power source 144, and the fluid quality sensor 146 to receive data from each of the various sensors and control operation of the valve assembly 122. The processing element 148 is substantially any type of device that can receive and execute instructions, such as, but not limited to, a processor, a microcomputer, or the like. It should be noted that the processing element 148 may include multiple elements, including elements that are stored on or housed on the server 103, as such, the discussion of any particular operation being performed by the processing element should be understood to be completed by either the on-board processing element in the flow detection hub, a processing element in the server, or a combination of the two. This configuration allows the flow detection hub 102 to utilize fast processing power and cloud computing, which may reduce the overall cost of each flow detection hub 102 as the processing power and memory storage may be reduced, while providing the same level of performance.

The network interface 150 provides communication to and from the flow detection hub 102 to the network 106. The network interface 150 may include one or more wireless networking components and/or hardwired components, such as a Universal Serial Bus (USB) cable, or the like. The configuration of the network interface 150 depends on the types of communication desired and may be modified to communicate via WiFi, Bluetooth, and so on.

The power source 144 is substantially any type of device for transmitting power to the flow detection hub 102. The power source 144 may also include combinations of devices, such as one or more batteries and a hardwired connection to allow communication with an external power source, such as a wall outlet. In one embodiment, the power source 144 includes a main source (such as a hardwired connection) and a backup source 143. The backup source 143 may be a battery backup that allows operation of the valve 126 and the flow detection hub 102 in the event of a power loss. In some embodiments, the backup source 143 also allows the flow detection hub 102 to function in a basic mode, e.g., leak detection only state, while detecting continuous flow and automatically shutting off flow if the time exceeds a predetermined threshold.

The user interface 145 provides an input and/or output mechanism to allow data transmission to and from the user and the flow detection hub 102. For example, the user interface 145 may include a display screen 107 (such as a liquid crystal display), that outputs fluid signature data, system information, or the like to the user. As another example, the user interface 145 may be one or more light emitting diodes (LEDs) or other visual elements that illuminate in different colors and/or patterns to indicate certain status, data, valve status, network status (e.g., in communication with the network 106), flow data, and/or power. The user interface 145 may also include one or more input buttons that allow a user to directly input information to the flow detection hub 102. User input buttons may include a power button, reset button (e.g., system reset and/or wireless reset), manual valve button, connectivity status button, or the like.

The memory component 147 stores data used by the flow detection hub 102 to store instructions for the processing element 148. The memory component 147 may store data or content, and may be, for example, magneto-optical storage, read-only memory, random access memory, erasable programmable memory, flash memory, or a combination of one or more types of memory.

The fluid quality sensor 146 is substantially any type of device that can detect composition characteristics of fluids within the water supply pipe 104, e.g., pH, salinity, electric conductivity, dissolved oxygen, chemicals and/or nutrients (ammonia, nitrate, phosphate), or the like. For example, the water quality sensor 146 may be a total dissolved solids (TDS) sensor that uses electrical conductivity in the fluid to detect the present of certain chemicals, a spectrometer or the like.

With reference to FIG. 2, the flow sensor 132 detects characteristics of fluid flowing in the fluid supply pipe 104. The flow sensor 132 may be substantially any type of flow detection sensor, but in many embodiments it is an ultrasonic sensor that uses ultrasonic waves to detect the fluid characteristics. In these embodiments, the flow sensor 132 includes a first transducer 134, a second transducer 136, a first reflector 138, and a second reflector 140.

The transducers 134, 136 are positioned within the flow pathway defined by the hub pipe 120 and/or fluid supply pipe 104 or are otherwise configured to direct ultrasound waves into the fluid flowing within the pipes 104, 120. The two transducers 134, 136 are spaced apart from one another, such that the second transducer 136 may be slightly downstream relative to the first transducer 134. The spacing between the two transducers 134, 136 may be selected based on the diameter of the fluid supply pipe 104, fluid type, fluid volume, type and strength of the transducers and/or reflectors, or the like. The transducers 134, 136 emit one or more ultrasound sound waves (e.g., frequency above 20 kHz). Additionally, the transducers 134, 136 act to receive transmitted ultrasound waves from the other transducer. In this manner, the transducers 134, 136 act as transmitters and receivers for the ultrasound waves. The transducers 134, 136 may be angled towards the reflectors or may be positioned straight relative to the reflectors.

The reflectors 138, 140 are positioned in the fluid pathway as defined by the fluid supply pipe 104 and/or hub pipe 120. The reflectors 138, 140 reflect the ultrasound waves from the transducers 134, 136 in a desired direction, e.g. towards the other reflector and/or towards a transducer. For example, the reflectors 138, 140 may be metal, alloy, steel, brass, or the like. The type of material selected for the reflectors 138, 140 may be selected to have a desired acoustic impedance such that substantially all of the sound wave impacting the reflector will be reflected in a desired direction with limited scattering.

In some embodiments, the reflectors 138, 140 are configured to reflect the ultrasound waves in two directions. For example, the first reflector 138 is configured to reflect sound waves from the first transducer 134 towards the second reflector 140, as well as reflect sound waves reflected by the second reflector 140 towards the first transducer 134. In this manner, the reflectors 138, 140 are bidirectional, allowing a single set of reflectors 138, 140 to be used to two-way sound wave communication.

In a specific implementation, the reflectors 138, 140 include a reflecting face that is angled at 45 degrees towards the opposite reflector 138, 140. For example, the first reflector 138 is configured such that the angled face is facing towards the second reflector 140 and the second reflector 140 is configured such that the angled face is facing towards the first reflector 138. In this configuration, the two reflectors 138, 140 may be positioned beneath the first and second transducers, respectively, as well as positioned to provide a direct path for the waves between each other. By including the angled faces and direct wave path, the reflectors 138, 140 help to reduce echoes in the sound waves, thus reducing noise and errors, in the data captured by the flow meter 132. Additionally, the angled faces of the reflectors allows the reflectors to reflect the ultrasonic waves at approximately a 90 degree shift from the angle the waves encounter the reflectors.

Figure 4:
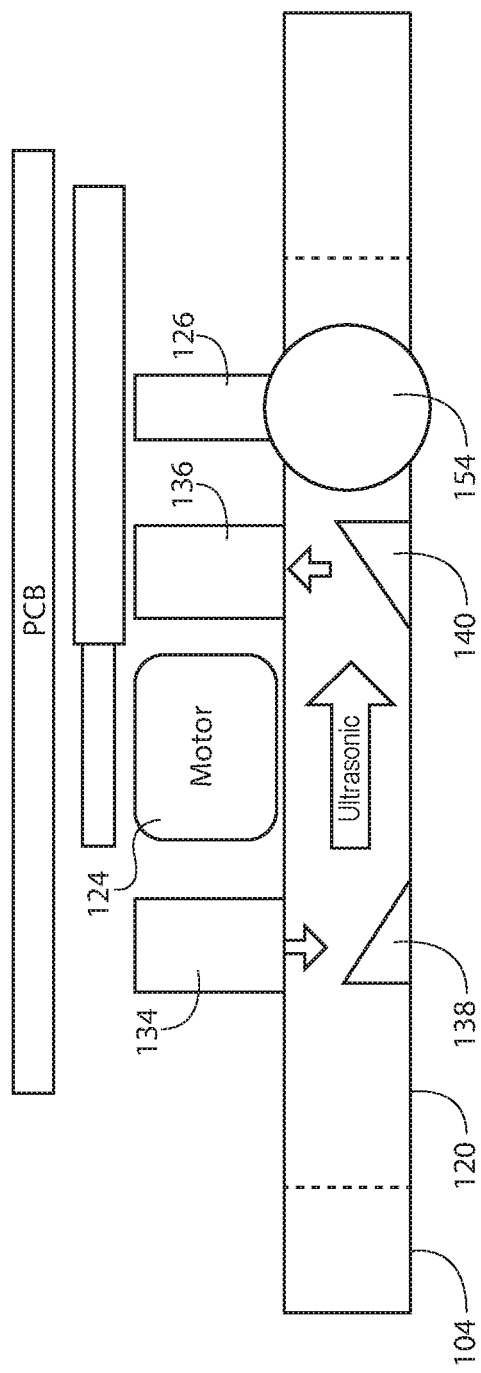
FIG. 4 is a cross-section view of the flow detection hub illustrating a transmission process for the flow detection hub.

Operation of the flow sensor 132 will now be discussed. FIG. 4 is a diagram illustrating a downstream transmission direction of the sound waves. With reference to FIG. 4, in some embodiments, the flow sensor 132 uses time of flight to detect the flow characteristics; the first transducer 134 emits a first sound wave having predefined characteristics (e.g., frequency, shape, etc.). The first sound wave travels through the fluid flowing in the hub pipe 120 and impacts the first reflector 138. Due to the angled face of the first reflector 138, the sound wave is reflected at approximately a 90 degree angle towards the second reflector 140, which is positioned downstream from the first reflector 138. As the sound wave impacts the second reflector 140, the angled face reflects the sound wave at a 90 degree angle upwards towards the second transducer 136. The second transducer 136 then provides the received sound wave to the processing element 148 which compares the received wave with the transmitted wave to determine changes in the wave characteristics, as well as the time between transmission and reception, which can be used to determine characteristics of the fluid flowing within the pipes 104, 120.

Once the downstream transmission direction has been completed, the flow sensor 132 may reverse the transmission and receiving process to complete an upstream transmission. For example, during the reverse transmission, the second transducer 136 emits a sound wave, which is reflected by the second reflector 140 towards the first reflector 138, which then directs the sound wave upwards towards the first transducer 134. The received wave is then provided to the processing element 142, which analyzes the received wave with the emitted wave to determine changes to the wave during transmission within the fluid.

Using the upstream and downstream transmission information, the processing element 148 can average the data to determine additional characteristics about the flow within the pipes 104, 120. In particular, the sound waves will travel faster when traveling with the fluid flow (i.e., in the downstream transmission direction) as compared to traveling against the fluid flow (i.e., in the upstream transmission direction). Using a dual-direction transmission process, the flow sensor 132 can be used to determine the viscosity and thus the temperature of the fluid within the flow pipes 104, 120.

In some embodiments, the flow detection hub 102 may be calibrated at installation and/or during select time intervals to ensure accurate data and to allow low-flow detection. In particular, the flow meter 132 may be calibrated during known no-flow periods for the water supply pipe 104. For example, to calibrate the hub 102, the valve assembly 122 may be activated to turn the valve 126 to a closed position, stopping flow out of the water supply pipe 104. During this no-flow event, the flow meter 132 is activated to initiate the bi-directional or a single direction sensing process. After the sensing process has completed, the processing element 144 may use the detected values to zero out the system, meaning that the values detected correspond to instances of no-flow out of the fluid supply pipe 104, i.e., no devices are receiving or using fluid from the fluid supply pipe 104. This calibration process allows the flow meter 132 to optimize low flow measurements and more accurately detect low flow uses, such as, but not limited to, a running toilet, small leak, or the like. These type of low-flow events are not typically detectable by flow meters as the flow values are so minimal that they appear as noise within a conventional detection system. On the contrary, the flow meter 132 of the flow detection hub 102 dynamically and/or routinely calibrates to ensure accurate detection of low-flow events.

The flow detection hub 102 may also be calibrated to determine flow signatures for various devices connected to the fluid supply system and fluid supply pipe 104. For example, the flow detection hub 102 can be configured to detect the flow signature for a dishwasher, showerhead, master bathroom toilet, guest toilet, kitchen sink, outdoor hose, etc. In particular, in one embodiment the flow detection hub 102 includes a calibration process where a user selectively activates various fluid sources within the system and the flow detection hub 102 detects the flow characteristics during the activation of each source. An exemplary calibration method is discussed in more detail below with respect to FIG. 13.

Alternative Flow Detection Hub Embodiment

Figure 5A:
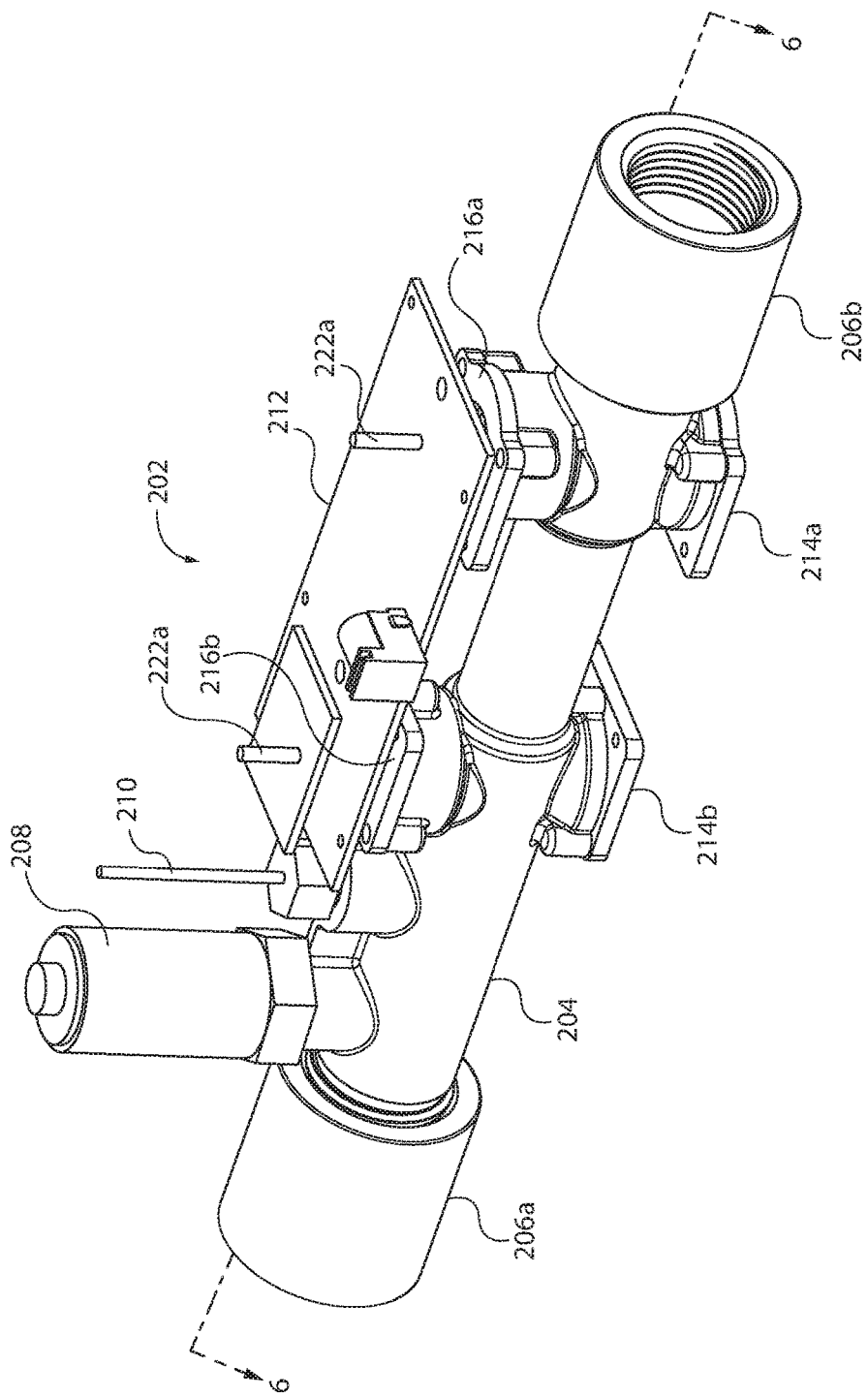
FIG. 5A is a side perspective view of another example of a flow detection hub.
Figure 5B:
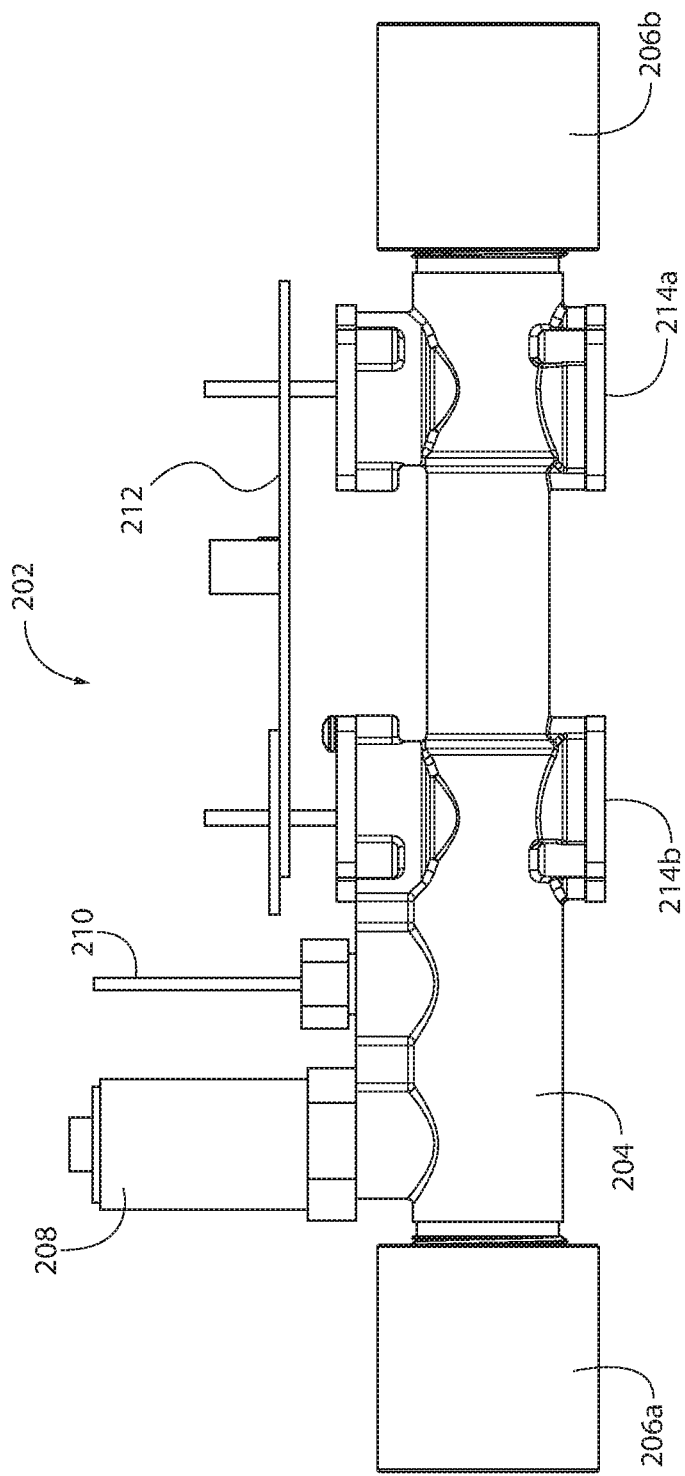
FIG. 5B is a side elevation view of the flow detection hub of FIG. 5A.
Figure 5C:
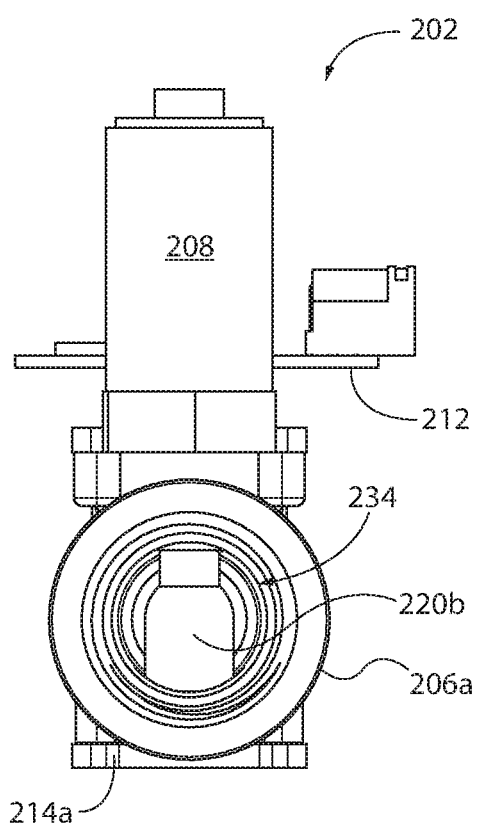
FIG. 5C is an end view of the flow detection hub of FIG. 5A.
Figure 6:
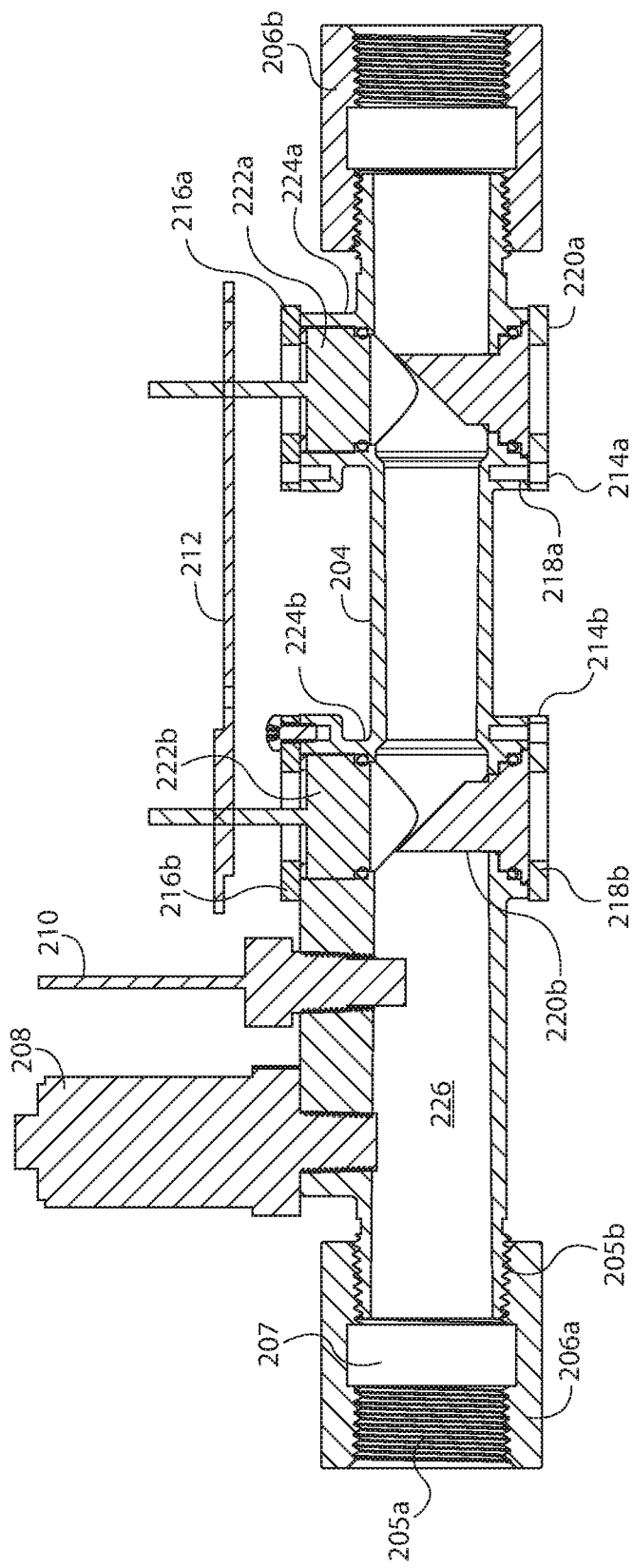
FIG. 6 is a cross-section view of the flow detection hub of FIG. 5A taken along line 6-6 in FIG. 5A.

Another example of a flow detection hub will now be discussed. FIGS. 5A-6 illustrate various views of the flow detection hub 202. It should be noted that the flow detection hub 202 may be substantially similar to the flow detection hub 102 and any features described with respect to a particular flow detection hub 102, 202 can be used with the other. Additionally, it should be noted that in FIGS. 5A-6, the valve assembly 122 has been omitted. However, the valve assembly 122 may be used and connected to the flow detection hub 202 in the same manner as described above with respect to the flow detection hub 102.

With reference to FIGS. 5A-6, the flow detection hub 202 may include a hub pipe 204, one or more connection mechanisms 206a, 206b for securing the hub pipe 204 to a fluid supply pipe 104, a pressure sensor 208, a temperature sensor 210, a circuit board 212, one or more reflectors 220a, 220b, one or more flow sensors 222a, 222b, and securing brackets 214a, 214b, 216a, 216b for connecting the reflectors and/or flow sensors to the hub pipe 204. Each of the elements will be discussed, in turn, below.

The connection mechanisms 206a, 206b may be formed as threaded collars that include interior threads 205a, 205b to mate with threading around the ends of the hub pipe 204 and fluid supply pipe 104. The interior threads 205a, 205b may be separated by a non-threaded section 207 to define two discrete threaded portions. The non-threaded section 207 defines a stop that prevents the terminal ends of the two pipes 104, 204 from abutting one another. Additionally, the non-threaded section 207 helps to prevent a user from over-inserting one of the two pipes 104, 204 which could make it difficult to insert the other pipe. In other embodiments, the non-threaded section 207 may be omitted.

In one embodiment, the diameter of the connection mechanism 206a, 206b is constant, but in other embodiments, such as when the fluid supply pipe 104 and hub connection pipe 204 have different diameters, the connection mechanisms 206a, 206b may have a varying diameter. Additionally, in some embodiments, the connection mechanisms 206a, 206b may be additionally secured to the two pipes 104, 204 via liquid sealants and adhesives (e.g., pipe cement, plumbing adhesive, or the like). Alternatively or additionally, the connection mechanisms 206a, 206b may include other sealing components or connecting elements to provide a fluid-tight seal.

The circuit board 212 may be substantially the same as the circuit 142 and may include the processing element 148 and network interface 150. Additionally, the circuit board 212 may be connected to or include the user interface 145 and any other input/output buttons or connections. The circuit board 212 electrically connects the flow sensors 222a, 222b, pressure sensor 208, and temperature sensor 210 to the processing element 148. For example, in one embodiment, the flow sensors 222a, 222b may connect directly to the circuit board 212 and the pressure sensor 208 and temperature sensor 210 are connected through one or more connection wires or buses (not shown). However, in other embodiments, different mechanisms, either wired or wireless, may be used to electrically connect the processing element 148 to the various sensors of the flow control hub 202.

Figure 7:
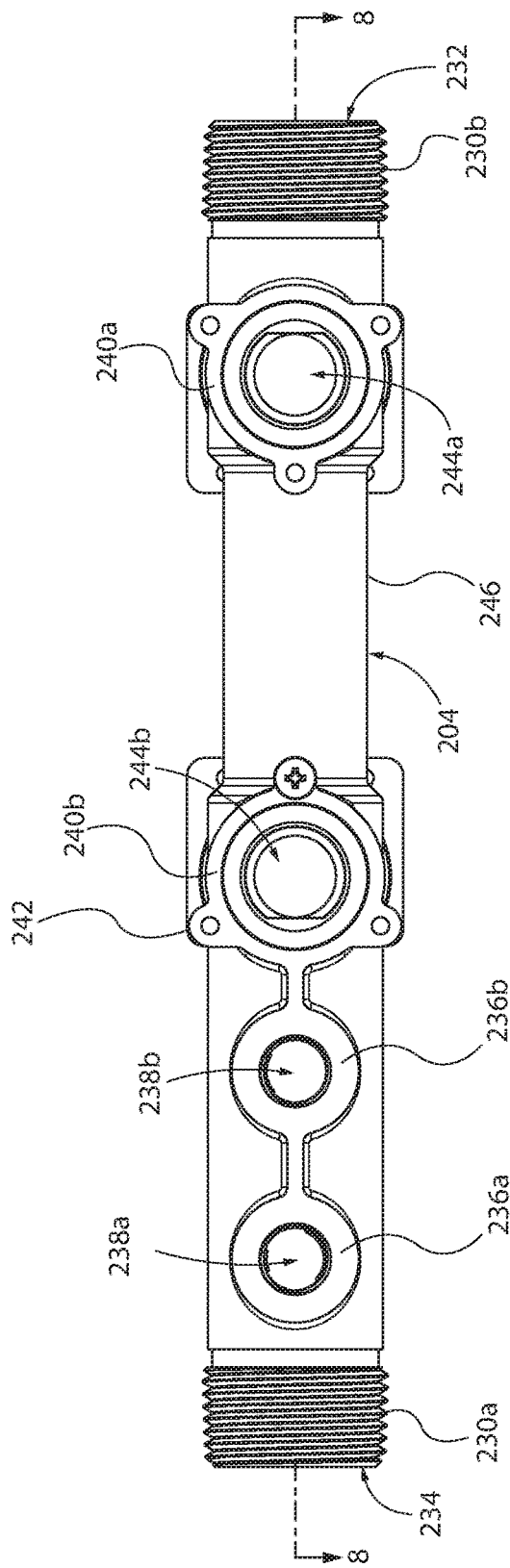
FIG. 7 is a front elevation view of a hub pipe for the flow detection hub of FIG. 5A.
Figure 8:
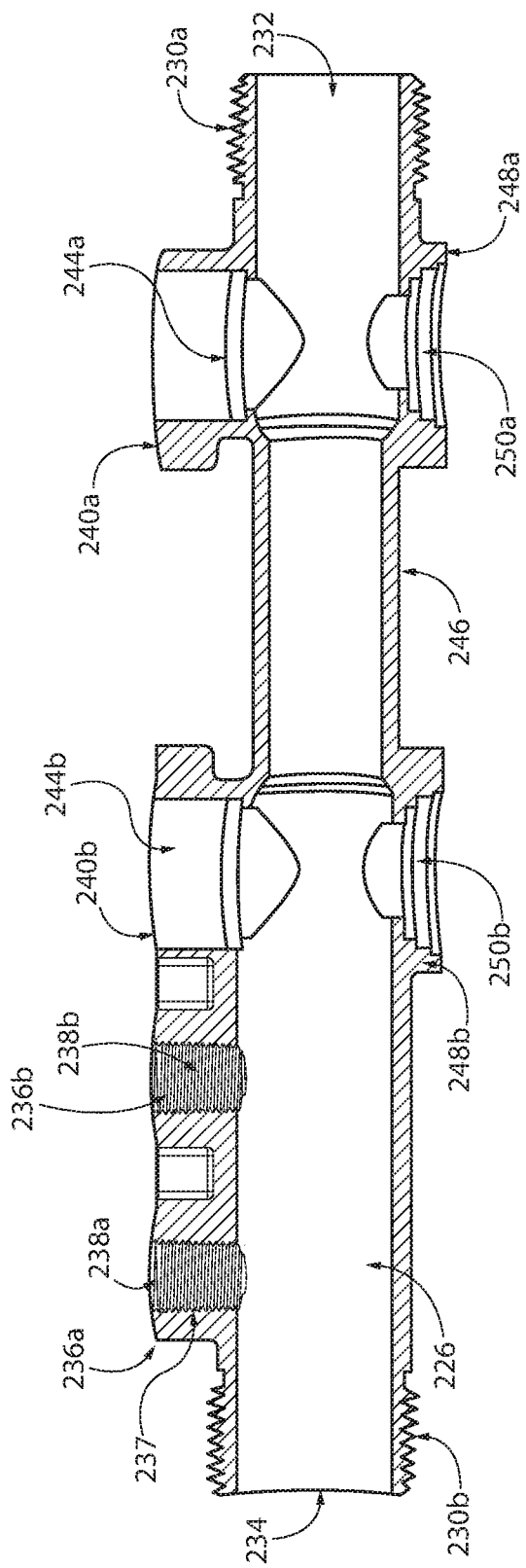
FIG. 8 is a cross-section view of the hub pipe of FIG. 7 taken along line 8-8 in FIG. 7.

The hub pipe 204 defines a scaffolding for supporting various components of the flow detection hub 202, as well as fluidly connecting the sensors 208, 210, 222a, 222b to the fluid supply pipe 104. FIG. 7 illustrates a right side elevation view of the hub pipe 204. FIG. 8 is a cross-section view of the hub pipe 204 taken along line 8-8 in FIG. 7. With reference to FIGS. 5B, 7, and 8, the hub pipe 204 defines a fluid passageway 226 fluidly connected to an inlet 232 and an outlet 234. The first end 230a of the hub pipe 204 and the second end 230b may include threading to mate with the connection mechanisms 206a, 206b.

In one embodiment, the inlet 232 is configured to direct the fluid past the flow sensors 222a, 222b first, i.e., the flow sensors 222a, 222b are downstream of the pressure sensor 208 and temperature 210. This configuration helps to ensure that the fluid characteristics are not modified by the sensors 208, 210 to allow more accurate readings of the flow characteristics by the flow sensors 222a, 222b. However, in other configurations, the inlet and outlet may be differently configure.

The fluid passage 226 extends through the length of the hub pipe 204. In one embodiment, the fluid passage 226 has a varying diameter and includes a pinched area 246 having a reduced diameter as compared to the other areas of the fluid passageway 226. In some embodiments, the pinched area 226 is defined by a reduced diameter in the hub pipe 204, but otherwise can be defined by internal changes. The pinched area 246 helps to increase the speed of fluid flow between the flow sensors 222a, 222b, which may enhance the sensitivity of the flow sensors 222a, 222b.

With reference to FIGS. 5B, 7, and 8, the hub pipe 204 includes a number of support structures that are used to secure the various sensors in position. The support structures may be formed integrally with the pipe 204 (e.g., through a molding or machining process) or may be separate elements connected to the pipe 204. In one embodiment, the hub pipe 204 includes two sensor collars 236a, 236b defined on a front surface. The sensor collars 236a, 236b are used to connect the pressure sensor 208 and temperature 210 to the hub pipe 204. Accordingly in embodiments where these sensors are omitted, the sensor collars 236a, 236b may also be omitted. The sensor collars 236a, 236b may include threading 237 on an interior surface thereof that may be used to mate with threads on the sensors.

Each of the sensor collars 236a, 236b surround a sensor aperture 238a, 238b defined through the front surface of the hub pipe 204. The sensor aperture 238a, 238b is used to allow the pressure sensor 208 and temperature sensor 210 to be in fluid communication with the fluid flowing through the fluid pathway 226. In other words, the sensor apertures 238a, 238b allow the sensors 208, 210 to extend into the fluid in order to detect various characteristics of the fluid during use. The size and shape of the sensor apertures 238a, 238b and sensor collars 236a, 236b may be varied based on the type of sensors used and as such it should be understood that the embodiments disclosed in FIGS. 5A-8 are meant as exemplary only.

The hub pipe 204 may also include one or more flow sensor brackets 240a, 240b. The flow sensor brackets 240a, 240b extend from a front surface of the hub pipe 204 and may include a plurality of fastening structures 242 outer an outer perimeter. The fastening structures 242 may include fastening apertures for receiving one or more fasteners to secure various components of the sensors 222a, 222b to the hub pipe 204. The flow sensor brackets 240a, 240b are used to support the flow sensors 222a, 222b and may be modified based on modifications to the flow sensors 222a, 222b. The hub pipe 204 defines two sensor apertures 244a, 244b that extend into and are fluidly connected to the flow pathway 226. In one embodiment, the flow sensor brackets 240a, 240b are positioned around the sensor apertures 244a, 244b.

With reference to FIGS. 5B and 8, the hub pipe 204 includes sensor support plates 248a, 248b on a rear surface thereof. The sensor support plates 248a, 248b are used to secure the reflectors 220a, 220b to the hub pipe 204 and may be modified based on changes to the reflectors 220a, 220b. In one embodiment, the sensor support plates 248a, 248b have one or more ledges extending from an interior surface, which as described in more detail below, may be used to support a bottom end of the reflectors 220a, 220b. As with the other sensors, the hub pipe 204 includes two sensor apertures 250a, 250b defined through the rear surface for fluidly connecting the reflectors 220a, 220b with the fluid in the flow pathway 226. The sensor apertures 250a, 250b are surrounded by the sensor support plates 248*a*, 248*b*. With reference to FIG. 8, the sensor apertures 250*a*, 250*b* are aligned with the sensor apertures 244*a*, 244*b* defined through the front surface of the hub pipe 204 which allows the reflectors 220*a*, 220*b* to be aligned with the flow sensors 222*a*, 222*b* and be positioned at the same location in the flow pathway 226.

Figure 9:
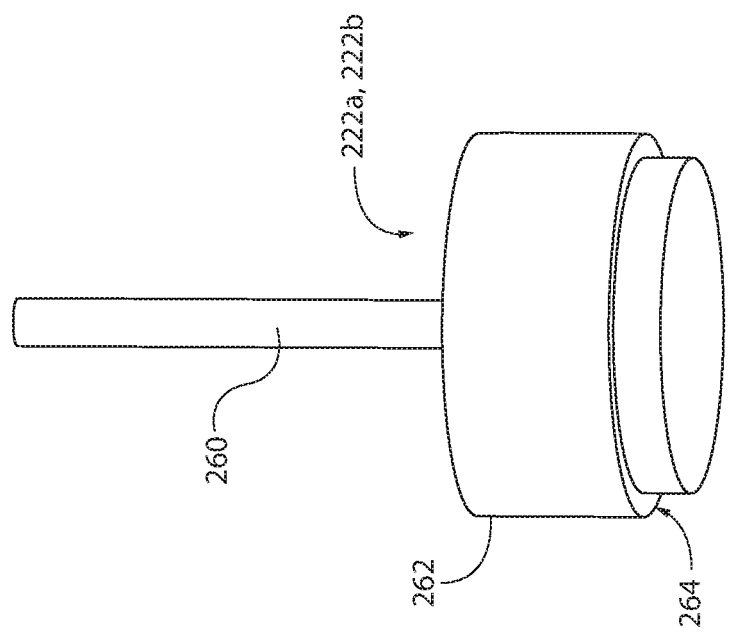
FIG. 9 is a bottom perspective view of a flow sensor for the flow detection hub of FIG. 5A.

The flow sensors 222*a*, 222*b* will now be discussed in more detail. FIG. 9 is a bottom isometric view of one of the flow sensors 222*a*, 222*b*. Each of the flow sensors 222*a*, 222*b* may be the same as one another and may be substantially the same as the transducers 134, 136 in the flow detection hub 102. With reference to FIG. 9, each of the flow sensors 222*a*, 222*b* may include a connecting element 260, which electrically connects the flow sensors 222*a*, 222*b* to the circuit board 212. The connecting element 260 is attached to the main body 262 that houses the sensing element, which in on embodiment is an ultrasonic transducer for producing ultrasonic sound waves (e.g., having a frequency above 20 kHz). Each of the flow sensors 222*a*, 222*b* may act both as receivers and transmitters, i.e., both can receive and transmit ultrasound waves (transceiver). The outer surface of the main body 262 includes a recess 264 for receiving a sealing element to seal a gap between the main body 262 and the sensor brackets 244*a*, 244*b* discussed in more detail below. In one embodiment, the flow sensors 220*a*, 220*b* may be similar to those produced by AUDIOWELL.

Figure 10:
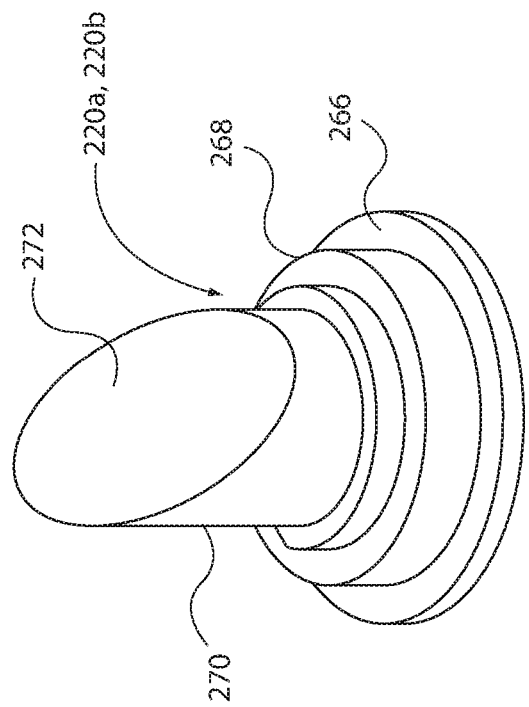
FIG. 10 is a top perspective view of a reflector for the flow detection hub of FIG. 5A.

The reflectors 220*a*, 220*b* will now be discussed in more detail. FIG. 10 is an isometric view of a reflector. The reflectors 220*a*, 220*b* may be substantially similar to the reflectors 138, 140 and act to reflect ultrasound waves in a desired direction. With reference to FIG. 10, each of the reflectors 220*a*, 220*b* may be substantially the same as one another, but may be oriented in different directions, one with a reflecting face facing downstream and one facing upstream. The reflectors 220*a*, 220*b* are configured to reflect the signals produced by the flow sensors 222*a*, 222*b* and direct them in a desired direction. In one embodiment, the reflectors 220*a*, 220*b* may be metal, alloy, steel, brass, or the like.

With reference to FIG. 10, in one embodiment, each of the reflectors 220*a*, 220*b* include a base 266, a stepped platform 268 extending from the base 266, and a reflector body 270 extending from the stepped platform 268. In one embodiment, the reflectors 220*a*, 220*b* are formed as integral components, but in other embodiments, the reflectors 220*a*, 220*b* may be formed as multiple components connected together.

The reflector body 270 may be a generally cylindrical body and include a reflecting face 272. The reflecting face 272 is an angled surface that extends at approximately a 45 degree angle. The shape of the reflecting body 270 and the orientation of the reflecting face 272 may varied based on the desired characteristics to be sensed by the flow detection hub 202. For example, the angled surface of the reflecting face 272 is configured to receive and reflect the ultrasound wave in two different directions. In particular, the reflecting face 272 is configured to receive the wave at one angle and reflect the wave at a second angle that is substantially perpendicular to the first angle.

With reference to FIGS. 5A, 5B, 6, and 8, assembly of the flow detection hub 202 will now be discussed. Initially, the various components are connected to the hub pipe 204, which then can be connected to the fluid supply pipe 104. For example, the pressure sensor 208 is positioned over the sensor collar 236*a* of the hub pipe 204 and a terminal end of the pressure sensor 208 is inserted into the sensor aperture 238*a*. The pressure sensor 208 is then connected, e.g., by mating to the threading 237 on the interior surface of the pressure sensor collar 236*a*. The temperature sensor 210 is inserted into the sensor rapture 238*b* and connected in a similar manner to the sensor collar 236*b* as the pressure sensor 208.

The flow sensors 222*a*, 222*b* are then connected to the hub pipe 204. Sealing elements 224*a*, 224*b* are received in the respective recesses 264 on each flow sensor 222*a*, 222*b*. The main body 262 of each flow sensor 222*a*, 222*b* is inserted into the sensor apertures 244*a*, 244*b* and positioned at least partially into the flow pathway 226. The securing brackets 216*a*, 216*b* are then positioned over the main body 262 of each flow sensor 222*a*, 222*b* and secured to the flow sensor brackets 240*a*, 240*b*, e.g., via one or more fasteners positioned within fastening apertures in the fastening structures 242. The connecting elements 260 are then electrically connected to the circuit board 212 and the processing element 148.

The reflectors 220*a*, 220*b* are connected by being inserted into the sensor apertures 250*a*, 250*b* and connected to the sensor support plates 248*a*, 248*b*. In particular, a sealing elements 218*a*, 218*b* is received around the stepped platform 268 and the reflector body 270 is positioned within the flow pathway 226. The first or upstream reflector 220*a* is inserted into the flow pathway 226 such that the reflecting face 272 is oriented downstream and towards the second reflector 220*b*. The second or downstream reflector 220*b* is positioned in the flow pathway 226 such that the reflecting face 272 is oriented upstream towards the first reflector 220*a*. In other words, the reflecting face 272 of each reflector 220*a*, 220*b* are oriented towards one another. Additionally, the reflectors 220*a*, 220*b* are aligned with the flow sensors 222*a*, 222*b* for reasons described in more detail below.

With the reflectors 220*a*, 220*b* inserted into the flow pathway 226, the securing brackets 214*a*, 214*b* are positioned on the sensor brackets 248*a*, 248*b* and connected thereto to secure the reflectors 220*a*, 220*b* to the hub pipe 204. It should be noted that the positioning of the reflectors 220*a*, 220*b* and the flow sensors 222*a*, 222*b* may be selected based on the diameter of the flow pathway 226, the fluid type, fluid volume, type and strength of the flow sensors and the reflectors.

When the sensors 208, 210, 220*a*, 220*b*, 222*a*, 222*b* are connected to the hub pipe 204, the connection mechanisms 206*a*, 206*b* are connected to the outlet 234 and inlet 232 ends of the pipe 204. In particular, the threaded portions 205*b* of each connecting mechanism 206*a*, 206*b* are threaded into the threaded ends 230*a*, 230*b* of the hub pipe 204. The housing 111 may be installed around the circuit board 212 and connected to the hub pipe 204.

To install the flow detection hub 202 onto the fluid supply pipe 104, a section of the pipe 104 is removed or a component is removed, and the hub pipe 204 is aligned with the remaining sections of fluid supply pipe 104. The connection mechanisms 206*a*, 206*b* are then threaded onto to the free ends of the fluid supply pipe 104. This fluidly connects the hub pipe 204 with the fluid supply pipe 104 and positions the flow detection hub 204 in the flow stream of water used by the main fluid supply.

In operation, the flow detection hub 202 may operate substantially similarly to the flow detection hub 102. In particular the upstream flow sensor 222*a* emits a first sound wave having predefined characteristics (e.g., frequency, shape, etc.). The first sound wave travels through the fluid and impacts the first reflector 220*a*, due to the angled face 272 of the reflector 220*a*, the sound wave is reflected at approximately a 90 degree angle and travels with the fluid flowing in the flow pathway 226 to the second reflector 220*b*. As the sound wave impacts the second reflector 220*b*, the angled face 272 reflects the sound wave at a 90 degree angle towards the second flow sensor 220*b*. The second flow sensor 220*b* then provides the received wave to the processing element 148 which compares the received wave to the initial wave and based on changes to the characteristics of the wave, as well as the time between the transmission and reception, can determine the characteristics of the fluid flowing.

In some embodiments, the flow detection hub 202 may complete and upstream and downstream analysis. In other words, after the downstream transmission described above is completed, the reverse transmission is conducted and the sound wave is emitted from the second flow sensor 220*b* towards the first flow sensor 220*a*. This process is the same, but in reverse, as described above with respect to the flow detection hub 102.

Using either or both the upstream and downstream information, the processing element 148 can determine the fluid flow characteristics of the fluid within the flow pathway 226. The additional information enhances the sensitivity of the calculations, but may not always be needed.

Figure 11A:
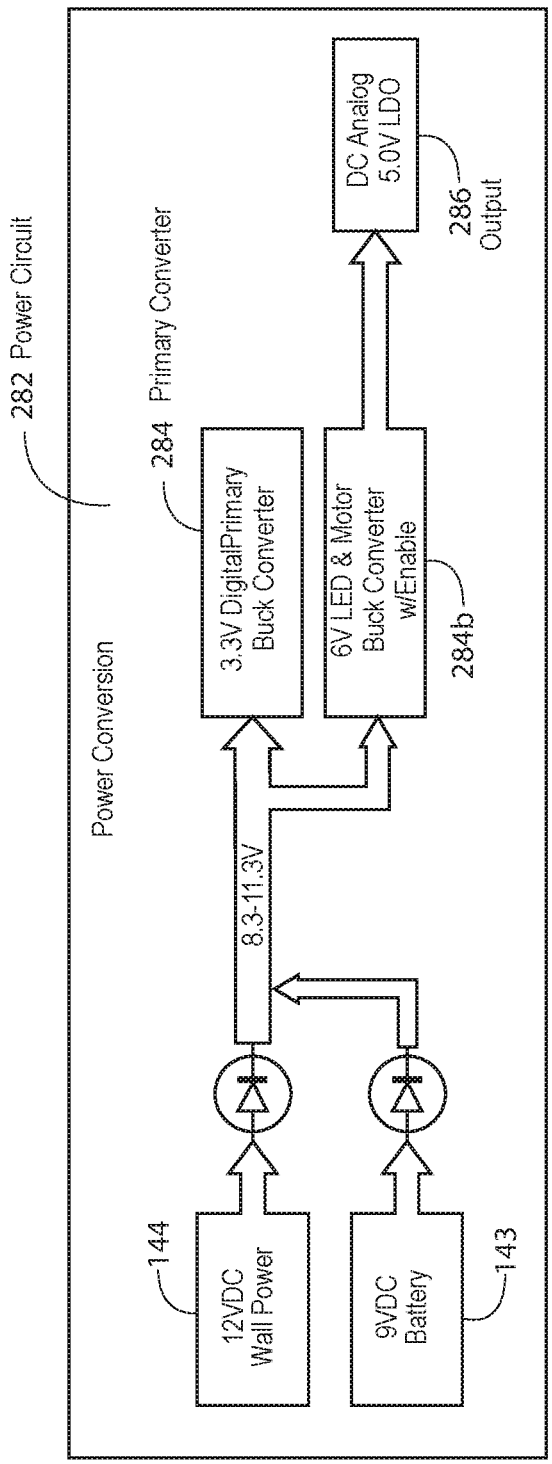
FIG. 11A is a first portion of a block diagram of the flow detection hub of FIG. 5A.
Figure 11B:
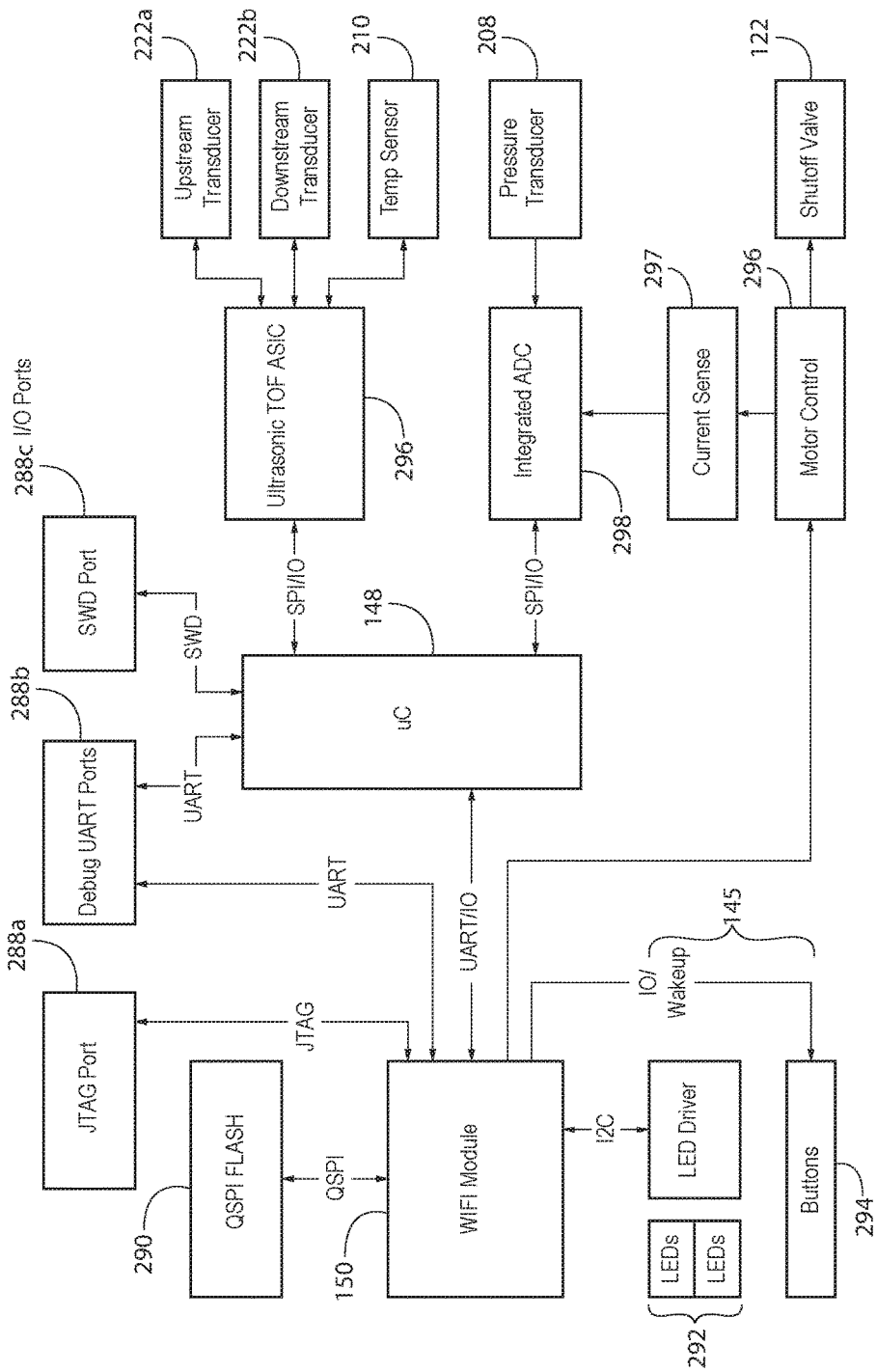
FIG. 11B is a second portion of a block diagram of the flow detection of the flow detection hub of FIG. 5A.

A specific implementation of the electronic connection of the flow detection hub 202 will now be discussed in more detail. FIGS. 11A and 11B illustrate sections of a block diagram of one embodiment of the flow detection hub 202. With reference to FIGS. 11A and B, in this embodiment, the flow detection hub 202 may include a power circuit 282 having both a main power source 144 (e.g., wall power, such as a 12 V DC) and a backup power source 143 such as a 9VDC battery or the like. The power sources 143, 144 are in electronic communication with a converter, such as a primary buck converter 284*a* and a secondary buck converter 284*a*. The two converters 284*a*, 284*b* may be connected to different components within the flow detection hub 202 or may be used to supply power at different times to the same components. An output 286 that may be a DC analog voltage may extend from the second converter 284*b*.

With continued reference to FIGS. 11A and 11B, the flow detection hub 202 may also include a plurality of input/output ports 288*a*, 288*b*, 288*c* such as a JTAG port, one or more debugging ports (e.g., UART, SWD), or the like. The input/output ports 288*a*, 288*b*, 288*c* may be varied depending on the version of the product. In some instances a closed product may omit some of the debugging ports or the like.

The flow detection hub 202 may also include one or more memory components 290, such as a flash memory, to store data for use during use. The networking interface 150, which in one embodiment is a WiFi module, may be in communication with the memory component 290, as well as the one or more processing elements 148. Additionally, the flow detection hub 202 may also include one or more input buttons 294 and feedback lights 292 (e.g., light emitting diodes) that may form a part of the user interface 145 to allow a user to interact with and receive feedback from the flow detection hub 202.

In some embodiments, the processing element 148 may include multiple components, such as a specific elements, such as a sensing circuit 296 that interact directly with the flow sensors 222*a*, 222*b* and optionally the temperature sensor 210 to determine flow characteristics. Similarly, the pressure sensor 208 may be in communication with a discrete processing element 298 that communicates with the main processing element 148. Each of these processing elements 148, 296, 298 in combination or separate from one another define a processing unit or element for the flow detection hub 202.

With reference to FIGS. 11A and 11B, in some embodiments, the flow detection hub 202 may include a current sense 297 connected to a motor control 296 that is connected to the shutoff valve 126. In these embodiments, the current sense 297 may be used to determine if the valve 126 is jammed (e.g., the current to the motor is increasing but the valve has not yet closed), and will provide additional power to the motor to close the valve 126. Additionally, in some embodiment's, the current sense 297 may provide an alert to a user to indicate that the valve is stuck or not operating properly. This allows a user to manually close the valve 126 if needed.

Figure 12:
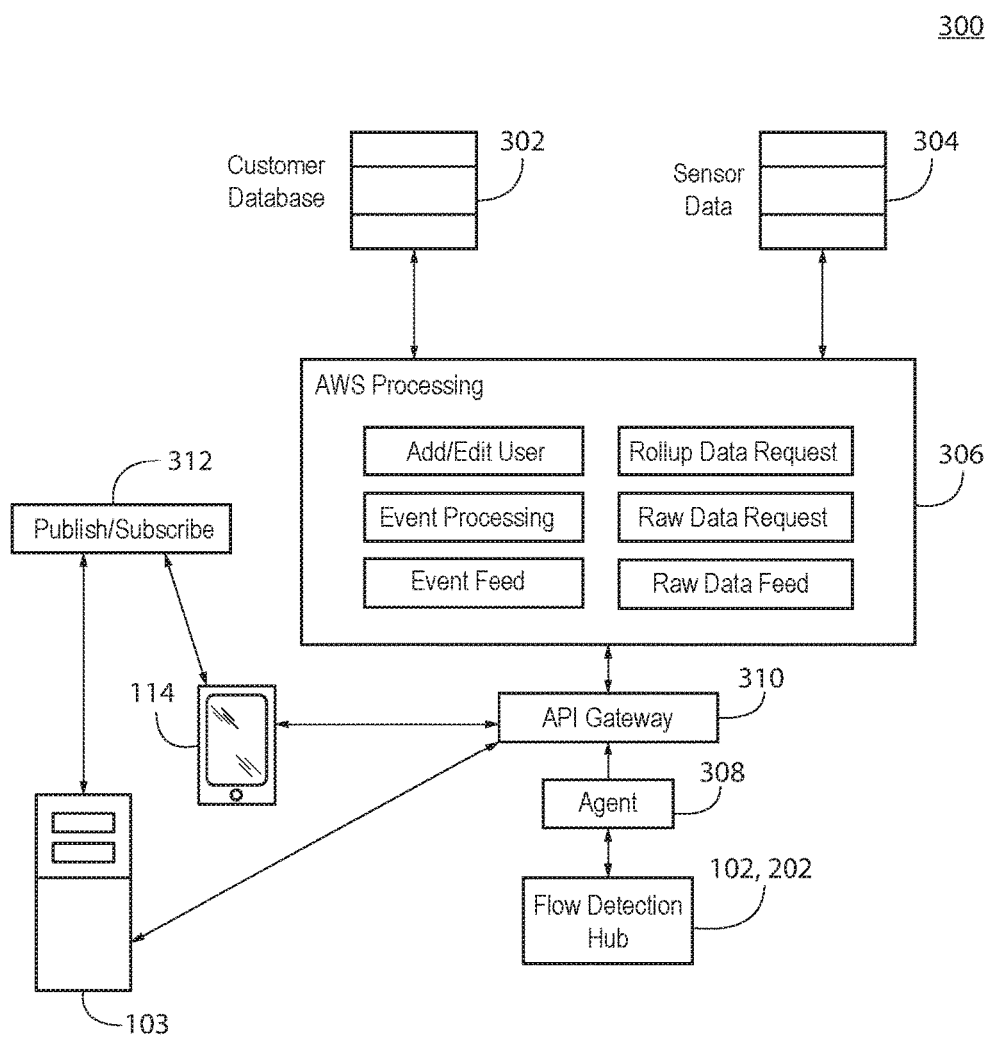
FIG. 12 is a block diagram of a system architecture that may be used with the flow detection hub of FIGS. 1B and 5A.

FIG. 12 illustrates a simplified diagram of one embodiment for a software architecture for the flow detection hub 102, 202. With reference to FIG. 12, the firmware elements for the architecture 300 include the flow sensors 222*a*, 222*b*, temperature sensor 208, pressure sensor 210, the valve assembly 122, user interface 145 (e.g., output LEDs), and/or the memory components 147. The firmware elements may be electronically connected to the processing elements 148 that are in electronic communication with the network 106 via the agent 308 which may be a microprocessor that connects one-to-one with the flow detection hub 202. The agent 308 may act as a communication broker between the flow detection hub 202 and an API gateway 310 (e.g., the AMAZON API Gateway). The agent 308 may also include memory components and store state information about the flow detection hub 202, including timers that help to drive and trigger actions or events by the flow detection hub 202.

The API gateway 310 may act as a single access point for all devices to send and receive information. Each API endpoint may call a unique lambda function to carry out requests. Examples of these calls include sending raw sensor data from the flow detection hub 202 to a sensor database 304, requesting rolled up sensor data summaries, logging events, and/or sending messages to users.

The API gateway 310 interacts with the AWS processing 306. The AWS processing section 306 may include one or more independent lambda functions designed to carry out specialized tasks. These lambda functions can connect to the user database, sensor database, publish/subscribe module 312, and the API gateway 310. In many instances the functions may be fairly minimal data pass through and formatting, but in some instances the data analysis functions my process sensor data. The AWS processing module 306 may include add/edit users, event processing, event feed, roll up data request, raw data request, and/or raw data feed. The AWS processing module 306 may be operated from the network 106 (e.g., cloud computing) or may include functions run by the flow detection hub 202 itself.

The publish/subscribe module 312 is a system used to send message to the applications and to a user (e.g., SMS text messages, emails, alerts, or the like). The messages may often be sent from a lambda function. Typically the publish/subscribe module 312 endpoints will be stored in a customer database 302 that includes the user contact information (e.g., phone number, email, etc.). The customer or user database 302 stores information about the associated application for the flow detection hub 202 for a user and may connect a user to the flow detection hub 202. The database 302 may be accessed by lambda functions.

The sensor database 304 is used to store all-time series data for the flow detection hub 202. For example, the sensor database 304 may store data corresponding to flow rate, water temperature, water pressure, event markers, event type marker with probability, and the like. In some embodiments, the sensor data is tagged with a device identifier that corresponds to the agent 308 of the device. In some embodiments sensor database 304 may be accessed by lambda functions.

In some embodiments, the system 100 may include a user application that is viewable on a user device 112, 114. The user application provides real-time information for the flow detection hub 102, 202 that indicates to the user the status of the flow throughout his or her property (e.g., house, apartment, building, or the like). Additionally, the user application defines a communication pathway that may be used to allow the user to input commands to the flow detection hub 102, 202 (e.g., turn of the main water supply), as well as allows the flow detection hub 102, 202 to transmit information to the user (e.g., potential leak). The user application may be set to be web-based and/or mobile (e.g., smart phone) based. In some embodiments the user application includes a user interface that provides the user access to information about the flow detection hub 102, 202 and system 100. Examples of features of the application include, but are not limited to, user login, open/close main water supply, water budgeting, alerts and messaging, real-time flow display, and/or water usage information (e.g., charts).

Calibration

In some embodiments, the flow detection hub 102, 202 may be calibrated before use. Calibration may reduce the length of time the flow detection hub 102, 202 is running or installed and can begin to correlate certain flow characteristics with flow events, as well as enhance the sensitivity of the results. The calibration may be done through many different options. In one embodiment, the system 100 (e.g., through the user application) may provide instructions to a user (e.g., through the user device 112) to flush the downstairs toilet, while no other water source is activated. As the user flushes the toilet, the flow detection hub 102 detects the flow characteristics in the fluid supply pipe 104 and assigns those characteristics with the downstairs toilet. Continuing with this example, the flow detection hub 102 may then request that the user activate the kitchen sink, while the other fluid devices are deactivated and measure the flow characteristics of the kitchen sink. Completing this type of calibration process for the various fluid devices in the water system, the flow detection hub 102 can assign flow signatures to each of the devices to allow the flow detection hub 102 to determine when a particular device is being used.

It should be noted that in some embodiments, the flow detection hub 102 may also use data from one or more fluid source sensors 110 to determine the flow signatures for the various devices. In these instances, the user may not be required to participate in the calibration process, as the flow detection hub 102 can use the water source sensors 110 to determine when a particular device is being activated.

Figure 13:
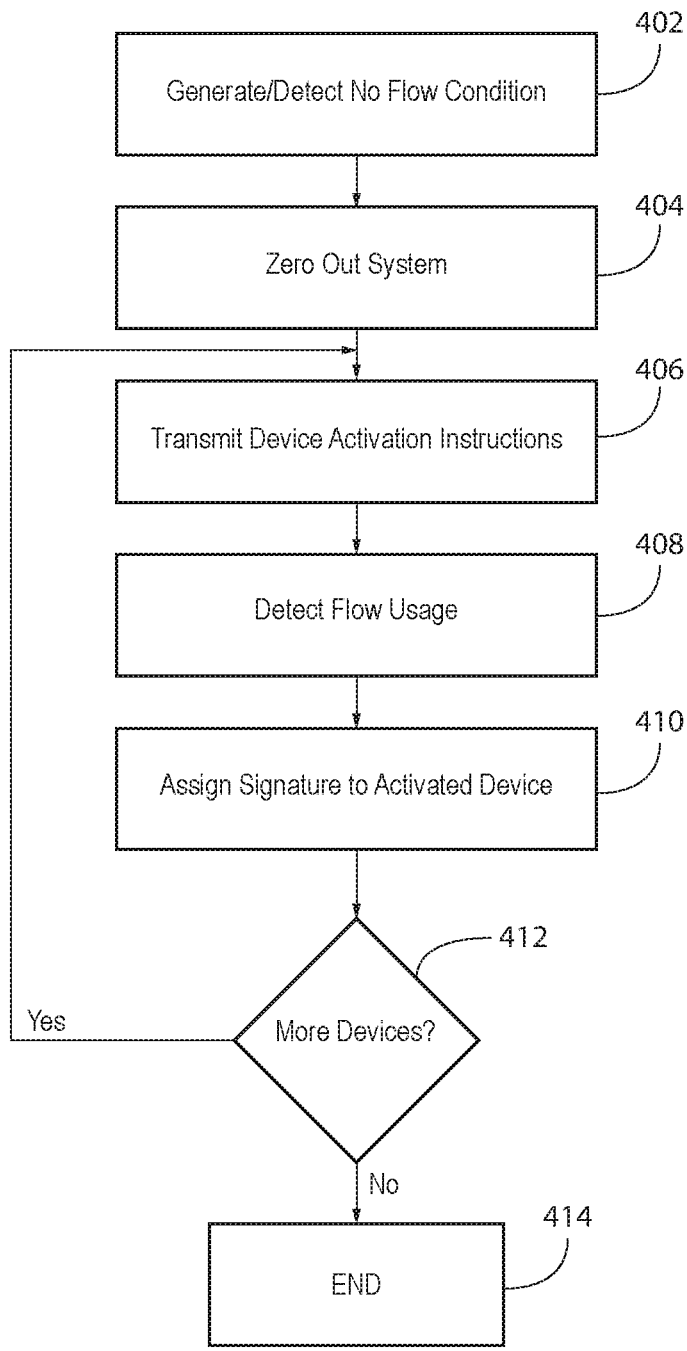
FIG. 13 is a flow chart illustrating a method for calibrating a flow detection hub.

FIG. 13 is a flow chart illustrating a calibration method 400. With reference to FIG. 13, the method 400 may begin with operation 402 and the flow detection hub 102, 202 may generate or detect a no flow condition. For example, in one embodiment, the flow detection hub 102, 202 may activate the valve assembly 122 to close the fluid supply valve 126. As the valve 126 is closed, the flow detection hub 102, 202 will experience no flow through the hub pipe 120, 204. As another example, the flow detection hub 102, 202 may detect when there is a no-flow condition based on readings from the one or more sensors 132, 208, 210, 222a, 222b. When the no-flow condition is activated, the method 400 may proceed to operation 404 and the processing element 148 zeros out the system. In other words, the processing element 148 sets the sensor flow readings to zero to establish the baseline for the flow detection hub 102, 202. After the system has been zeroed out, the valve assembly 122 reopens the valve 126 to allow flow back into the flow detection hub 102, 202 from the fluid supply pipe 104.

Once the flow detection hub 102, 202 is zeroed out, the method 400 may proceed to operation 406. In operation 406, the processing element 148 transmits device activation instructions to the user device 112, 114. For example, using the system architecture of FIG. 12, the user application receives the device activation information from the flow detection hub 102, 202 and then transmits the particular information to the user device 112, 114. The device activation include information to start water usage in a particular device (e.g., start the dishwasher, run the shower, turn on the kitchen sink) or the like. The information may also include a desired run time (e.g., 1 minute, 2 minutes, 3 flushes for the toilet).

After operation 406, the method 400 proceeds to operation 408. In operation 408, the flow detection hub 102, 202 detects the flow usage during the device activation. In other words, the flow detection hub 102, 202 uses the flow sensors 132, 222a, 222b in the manner described above to detect the flow characteristics of the flow through the flow supply pathway 226 during water usage of the particular device. In some embodiments the flow sensors 132, 222a, 222b may continuously transmit and receive data in order to ensure real-time detection of flow, in other embodiments, the flow sensors 132, 222a, 222b may be selectively activated at certain intervals or during the calibration procedure after the device activation instructions have been transmitted to a user device.

After the flow usage has been detected, the method 400 may proceed to operation 410 and a flow signature is assigned to the activated device. The flow signature may include flow characteristics such as flow rate, pressure, time of flow, or the like. In some embodiments the device may be activated multiple times for different lengths of time before the flow signature is generated, but in some instance may be generated after one activation.

After operation 410, the method 400 may proceed to operation 412. In operation 412, the system 100 may determine whether there are additional devices connected to the fluid supply pipe 104 to be activated. For example, the user application may present a question to the user, such as additional devices? Or may scroll through a previously generated list corresponding to the user's devices using water or a list of typical devices found in the same type of property as the user's. If there are additional devices that need to be assigned a flow signature, the method 400 may return to operation 406 and the activation instructions for the next device are presented. Alternatively, if there are no remaining devices, the method 400 proceeds to an end state 414 and the calibration is complete.

It should be understood that although various calibration methods have been disclosed, in some embodiments, the flow detection hub 102, 202 may not be calibrated or may be calibrated only to a zero or no-flow state. In other words, the calibration process may not include detecting flow signatures of different devices. In some embodiments, the flow signatures may be detected dynamically during use and the flow detection hub 102, 202 may "learn" based on common usage patterns and the like.

In some embodiments the flow detection hub 102 may include a combination of learning and manual or user actions to complete a calibration. For example, the flow detection hub 102 may select a period of time or calibration period where the flow detection hub 102 learns the flow states and patterns before requesting a user calibration. Using an operation similar to that discussed below with respect to FIG. 16, the flow detection hub 102 can begin to separate flow devices and particular patterns and use the use calibration to refine the categorization. For example, the flow detection hub 102 may track flow events sufficiently to identify specific devices (e.g., a flow event with select characteristics corresponds to a toilet flushing) and then the calibration may include a question to the user of "which toilet was just flushed." This combination enhances the sensitivity of the flow detection, but does not require specific flow sensors and a reduced demand on the user.

Flow Events and Device Signatures

Figure 14:
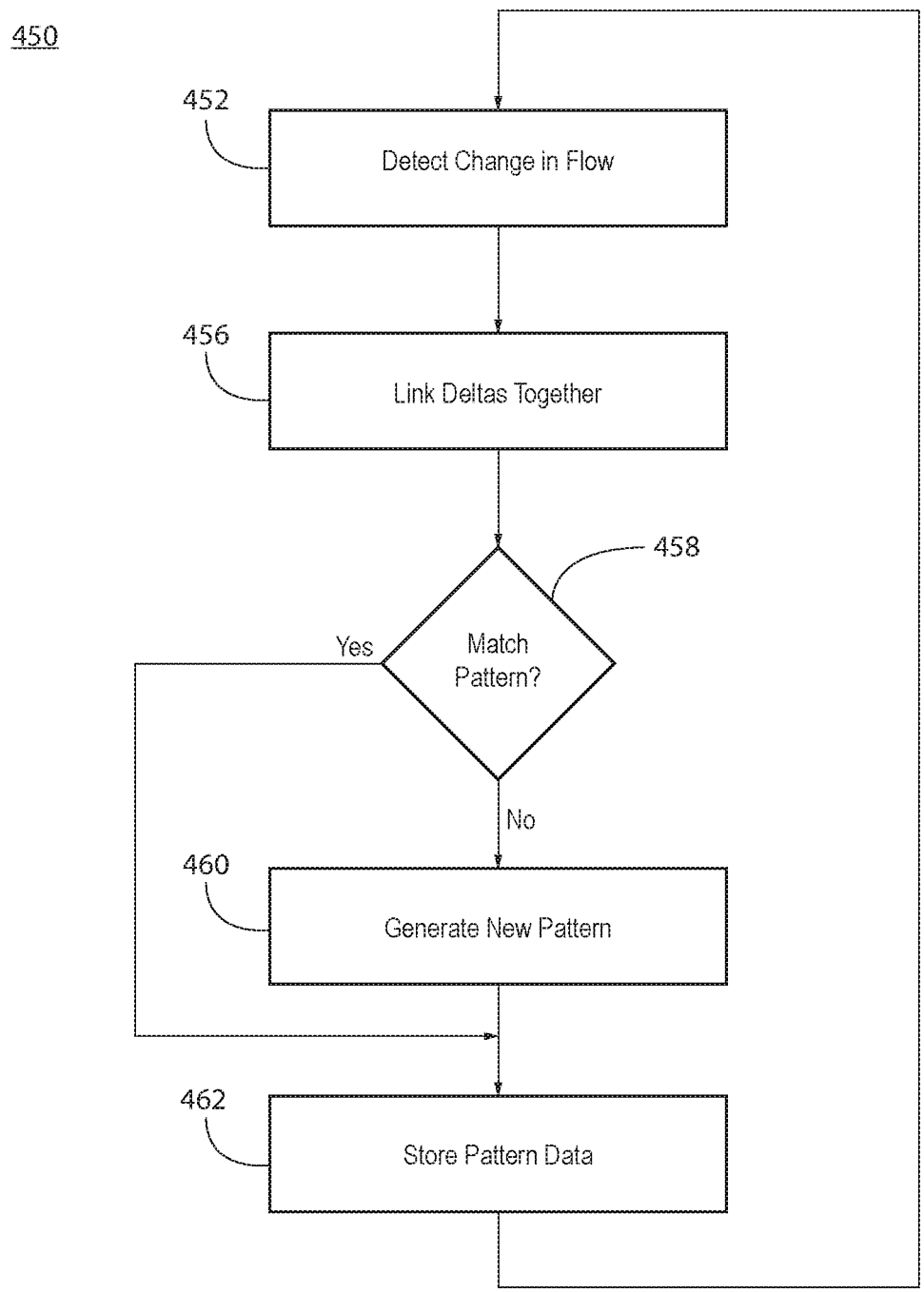
FIG. 14 is a method for linking detected flow characteristics with specific devices or flow events.

A method for detecting flow events and generating patterns will now be discussed. FIG. 14 is a flow chart illustrating a method 450 for generating flow patterns. With reference to FIG. 14, the method 450 may begin with operation 452. In operation 452 the flow detection hub 102, 202 detects a change in flow. For example, using the flow sensors 132, 222a, 222b, as well as optionally the pressure and/or temperature sensors 208, 210, the flow detection hub 102, 202 detects variations in the flow through the flow pathway 226. The change in flow may correspond to having flow in the flow pathway 226 as compared to no flow, i.e., the change may be from a zero flow state, or the flow change may be from a first flow to a second flow (e.g., an increase in speed, volume or the like). In other words, the flow detection hub 102, 202 detects a delta from a baseline or previous state, e.g., the delta generator operation marks changes in the flow conditions (e.g., flow up or flow down) and optionally tracks changes in other fluid characteristics as well.

Figure 17:
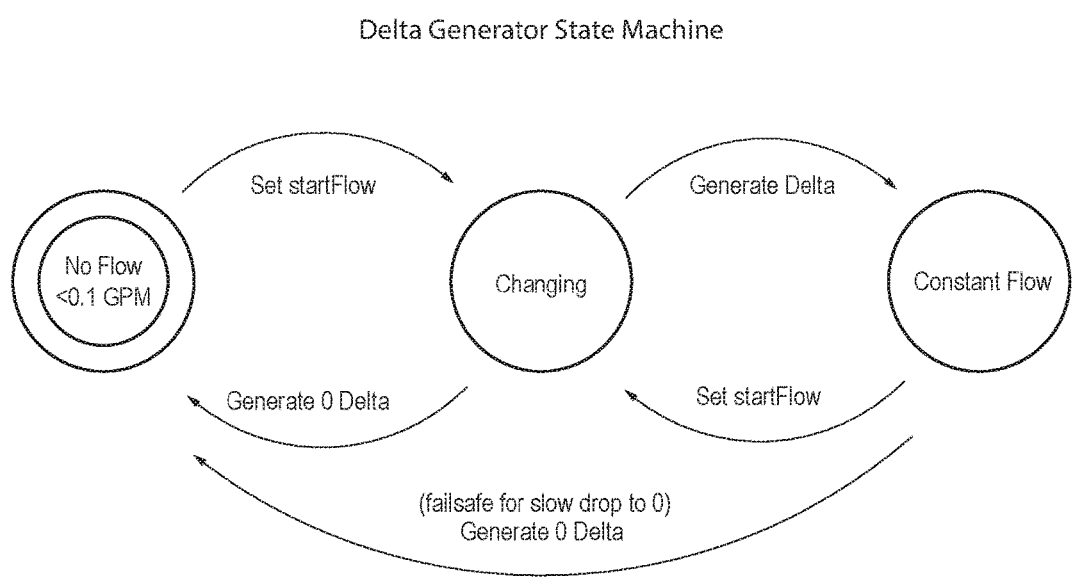
FIG. 17 is an example of a state machine that may be used to detect changes in flow characteristics.

FIG. 17 illustrates one embodiment of a delta generator state machine that may be used during operation 452. The changes in flow are detected by the flow detection hub 102, 202 using the process described above with the flow sensors and reflectors.

Figure 15:
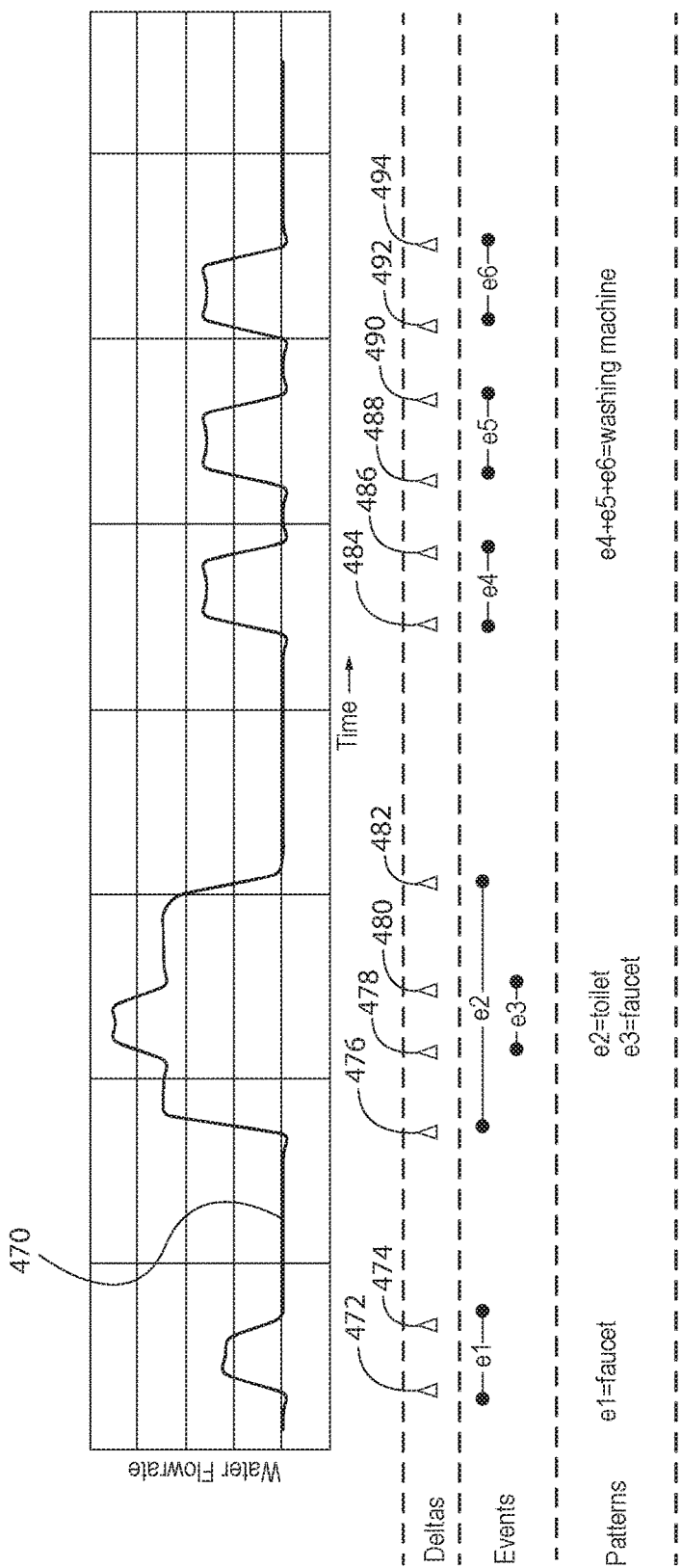
FIG. 15 is a graph illustrating examples of flow deltas being linked to flow events and devices.

After operation 452, the method 450 may proceed to operation 454 and the processing element 148 links together corresponding deltas. FIG. 15 illustrates a graph of flow rate versus time illustrating various deltas 472, 474, 476, 478, 480, 482, 484, 486, 488, 490, 492, 494 that occur over a baseline flow 470 or previous flow state. The deltas may occur to an initial change to the baseline flow 470 or a secondary change from the original baseline 470 and still be tracked as a delta.

When linking deltas, the processing element 148 may look to two or more deltas that match for a particular event, such as an increase in flow rate and the corresponding decrease in flow rate. The time between the related deltas can then be considered an event. With reference to FIG. 15, in one example, the first deltas 472, 474 occur without any other changes in the flow rate or flow conditions. The first delta 472 indicates an increase in flow rate from the baseline 470 and the second delta 474 indicates a downward change or decrease in flow rate from the elevated flow rate that occurred after the first delta 472. In this example, the processing element 148 may determine that these two deltas 472, 474 should be linked together as corresponding to a single event, the first delta 472 indicating the start of the event and the second delta 474 indicating the end of the event.

Similarly, the next four deltas 476, 478, 489, 482 may be interlinked as they correspond to variations from the baseline flow and then from the elevated flow. The third delta 476 indicates a large increase from the baseline flow 470, the fourth delta 478 indicates an increase from the elevated flow rate, the fifth delta 480 is a change down from the second increase in flow rate back to the original flow increase, and finally, the sixth delta 482 indicates as change back to the original baseline 470 flow. In this instance, the processing element 148 may determine that the third and sixth deltas 476, 482 correspond to one event e2 (e.g., increase and corresponding decrease in flow) as these deltas 476, 482 indicate the change to and from the baseline 470 to the first elevated level. The fourth and fifth deltas 478, 480 in this example may be linked together as corresponding to another event, event e3, that occurred during the second event e2 since these deltas correspond to an increase and decrease in flow from the elevated flow rate.

With continued reference to FIG. 15, the remaining deltas 484, 486, 488, 490, 492, 494 may be linked in a similar manner as the first and second deltas. That is, the deltas corresponding to an increase and subsequent decrease in flow may be linked to define different events, in this case event e4, event e5, and event e6. The processing element 148 may generate one or more events that include the linked deltas. With reference to FIG. 15, in this example, there may be six linked events event e1, event e2, event e3, event e4, event e5, event e6. The events event e1, event e2, event e3, event e4, e5, event e6 correspond to a particular device or set of devices that is activated to cause the increase and decrease in the flow rate.

After the detected deltas are linked, the method 450 may proceed to operation 458 and the processing element 148 determines whether the linked deltas match a predetermined pattern or flow signature. For example, the processing element may compare the data corresponding to the deltas, as well as the data related to the correlation of the deltas to a predetermined pattern. For example, additional flow data, such as pressure, temperature, and the like, may be used along with flow rate data. In one embodiment, the frequency of the pressure, slope of the pressure signal, and deviation from a starting point may all be factors that indicate that a particular flow event matches a pattern or the flow signature for a device. In short, different data features, such as slope, overshoot, undershoot, rise time, fall time, frequency, or other signal characteristics, may be present with various data sets corresponding to pressure, flow rate, temperature, and the like. These data features can then be used to provide additional information and assess each of the flow events.

The pattern may be previously stored from the user's past flow history, may be determined using the calibration method 400, may be a conventional pattern from other user's information, or a combination of the above. The pattern may also include the flow signature data determined during the calibration process 400 or device data from the one or more device or remote flow sensors. In other words, the pattern indicates the operation of one or more particular water-using device (e.g., sink, toilet, dishwasher, washing machine, ice maker, refrigerator, hose, sprinkler system, etc.) and further may be linked to a particular action with the specific device.

When the linked deltas or flow event does not match a predetermined pattern, the method 450 may proceed to operation 460 and a new pattern may be generated. In particular the processing element 148 may generate a pattern profile matching a particular flow event or events. In some embodiments, the processing element 148 may include a probability factor in the linking to indicate the likelihood that the deltas are related to the same type of device or event. In these embodiments the probability may increase over the use of the flow detection hub 102, 202 and forms part of the learning intelligence of the system 100.

With reference to FIG. 15, the events event e1, event e2, event e3, event e4, event e5, event e6 are linked to certain patterns. In one example, the delta information, flow characteristic information detected by the flow detection hub 102, 202, as well as environmental data (e.g., user input information, external flow source sensors, communication with smart devices (e.g., power switches, etc.), time of day, home/away status, weather, external flow data from nearby properties, event history, human behavior (e.g., toilet and sink typically used close in time, sink and dishwasher used together)) can be used to generate the pattern and provide connect to the events. In one example, the first event e1 may be determined to correspond to a kitchen faucet running. This may be based on the time between the first and second deltas 472, 474, as well as the flow rate level between the two deltas.

As another example, event e2 may be linked to the flushing of a toilet given the extended period of time between the increase delta and the decrease delta. Event 3 may be determined to be the bathroom sink faucet operating based on the small increase in flow, the time period, and because it is running between the increase/decrease flow changes from the toilet flushing. Finally, the last example, event e4, event e5, and event e6 may correspond to the washing machine going through its wash and rinse cycles. This pattern may be determined based on the similarities in flow rates and times for each set of deltas, as well as the intermittent pattern and closeness in time between each event.

Figure 16:
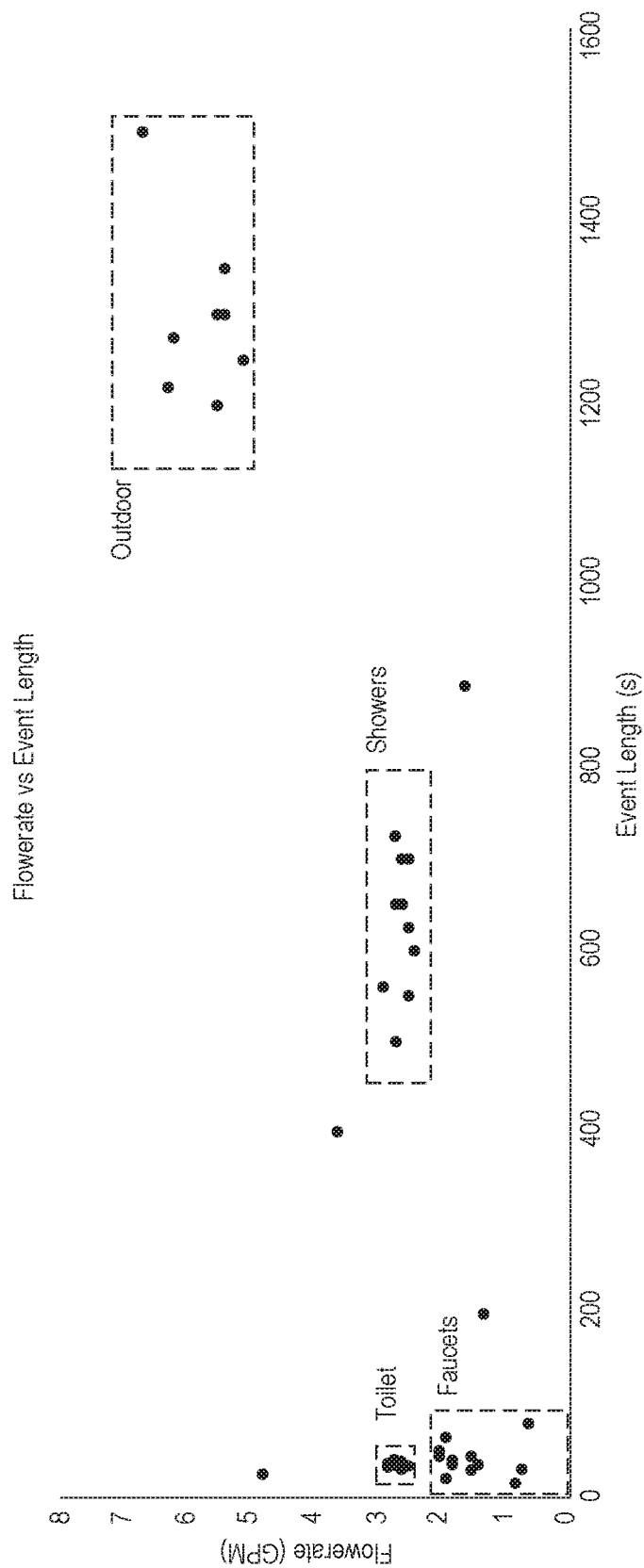
FIG. 16 is a graph illustrating examples of pattern boxing and event probabilities.

FIG. 16 illustrates a graph of flow rate versus event length that can be used to determine whether an event matches a known pattern. With reference to FIG. 16, certain devices may have known or predetermined flow rates that occur over a period of time, e.g., showers may have longer time spans as compared to sinks or toilets. Similarly, outdoor use (e.g., hose, sprinklers, irrigation) may have increased flow rates as compared to inside devices. Using mathematical similarity calculations, as well as optionally probability calculations, boundaries (e.g., boxes) may be defined around the clusters of flow rate events and these boundaries are used to define the patterns. For example, the processing may use a flow rate length and event time that falls within the boundaries outlined in the graph in FIG. 16 to determine that the event is a particular pattern.

If in operation 458 the pattern matches a pre-stored or known pattern or after the new pattern is generated, the method 450 proceeds to operation 462 and the pattern data is stored in the memory component 147. The method 450 may then return to operation 452 and continue to detection changes in flow.

In some embodiments, various operations and data generation of the method 450 may be done locally on the flow detection hub 102, 202 and others may be done by servers 103 via the network 106. For example, in one embodiment, the delta generation (i.e., the logging of the different flow deltas) is done by and stored on the flow detection hub 102, 202 and the event linking and pattern generation may be done on the server 103 using data from the flow detection hub 102, 204, the user and sensor databases 302, 304, and the like. As such, it should be understand that although certain operations are discussed as being completed by the processing element 148, the processing element 148 may be housed within he flow detection hub 102, 202 and/or the server 103 and may include multiple processors interacting together.

Alerts Using the Flow Detection System

Using the determined flow signatures and flow detection, the flow detection hub 102, 202 and system 100 can be used to detect flow events (e.g., leaks, pipe breaks, abnormal usage, etc.) and provide alerts to a user and/or automatically shut off the water supply to the water system (e.g., close off the main water supply). The flow detection system 100 may take into account system data (e.g., typical flow patterns and usage), external data (e.g., temperature), and user data (e.g., on vacation, away from the house, multiple guests staying at the house, etc.). As a first example, the flow detection system 100 may provide an alert to a user device 112 that the water temperature in the pipes 104, 120 is too low. The user, or in instances where the device 112 is a smart home device, may then increase the temperature in the house or water heater. As a second example, the flow detection system may be used to activate a stereo in a user's bathroom when the shower is turned on or turn on a kitchen light (if it is not already on) when the kitchen sink is activated.

The flow detection system 100 may also be used to provide flow signature and other data to the user. For example, the flow detection system 100 may provide usage data, patterns, water costs, or the like to the user based on the flow characteristics detected. As a specific example, the flow detection system 100 may provide a user with an alert when water usage is close to exceeding a predetermined threshold (e.g., passing a tier in a tiered water cost structure). As another example, the flow detection system 100 may provide an alert to a user that a usage is varying from a typical usage pattern. The system 100 may provide push alerts to a user's device 112, as well as allow a user to vary settings of the system. For example, the user may input an "away" setting to the flow detection hub 102 to indicate that the user is going to be away from the property for a period of time so that any flow during this time should be reported or using the valve assembly 122 the flow detection hub may be configured to automatically turn off the fluid supply to the house.

Other examples of alerts including alerting a service provider, such as a plumber, in instances of flow events. For example, if a leak is detected, the flow detection hub 102 may provide an alert to both the user (e.g., property owner), as well as to a plumber to allow the plumber to schedule a time to fix the leak. In this manner, the user may easily and seamlessly address leaks and other issues with the system, without requiring the user to separately schedule a time with the plumber or other service provider.

As another example, the flow detection system 100 may interpret user behavior within the fluid system. For example, the flow detection system 100 can use flow signature data to determine whether a user is present within the home, e.g., shower activated at 8 am, sink at 8:20 am and toilet in the master bathroom at 8:30 am on Monday means at 9:00 am means that the user is on his or her way to work and no longer present in the house. In short, the system 100 allows detection of fluid usage patterns and analyzes those patterns (optionally with external data) to detect use presence and predict user behavior.

Figure 18:
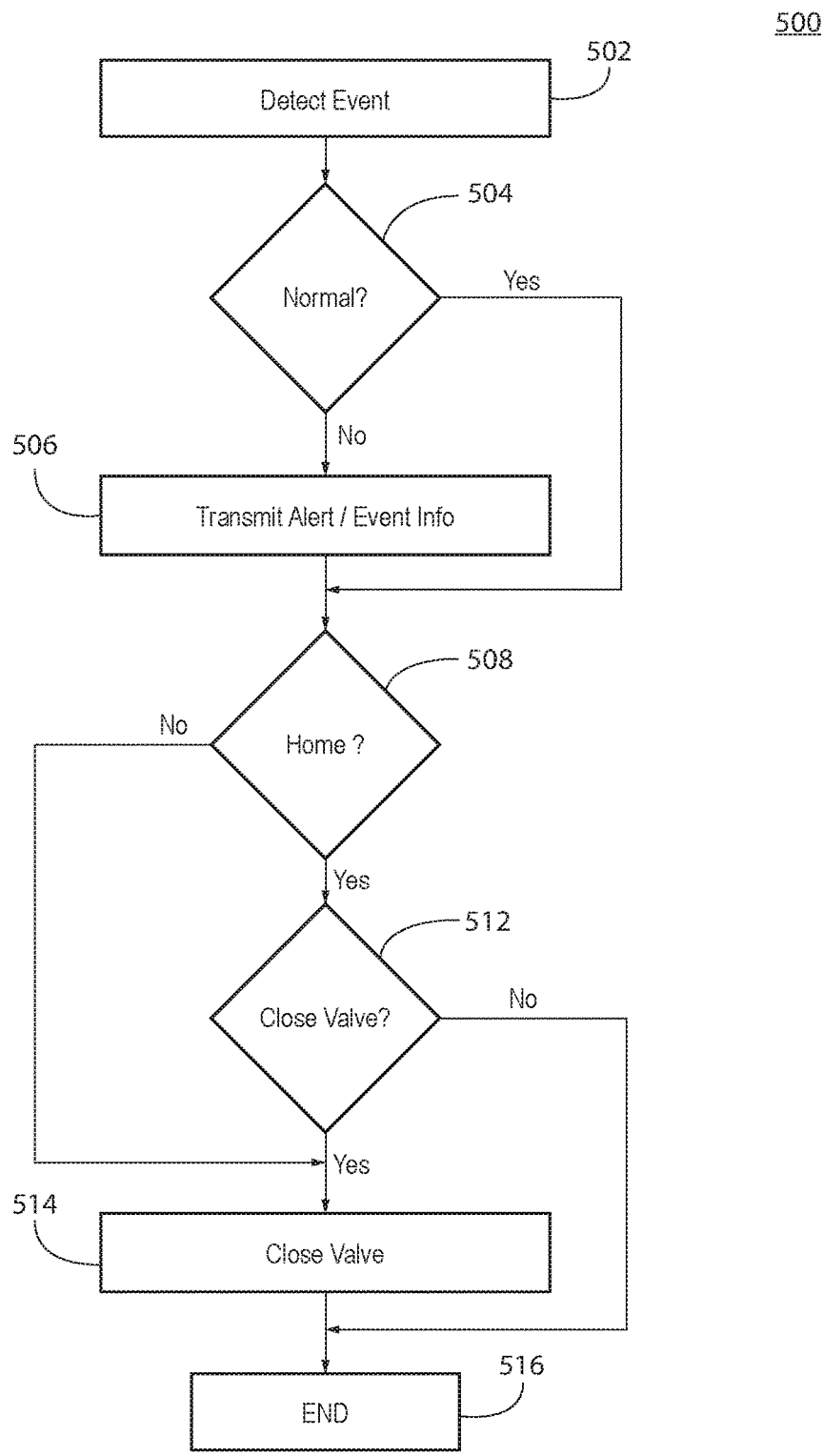
FIG. 18 is a flow chart illustrating a method for responding to certain flow events.

FIG. 18 illustrates a flow chart for a method of detecting events and activating the valve assembly 122 and/or transmitting alerts to the user device 112, 114. With reference to FIG. 18, the method 500 may begin with operation 502 and the flow detection hub 102, 202 may detect a flow event occurring. For example, the flow detection hub 102, 202 using the method 450 in FIG. 14 may determine that based on changes in the flow rate and other fluid characteristics, an event is occurring. After an event has been detected, the method 500 may proceed to operation 504. In operation 504 the processing element 148 determines whether the event is normal or expected. This operation may vary based on whether a user is home or away, which may be input into the system 100 directly by the user or indirectly (e.g., based on global positioning sensors in the user's device 112, 114). Additionally, whether an event is normal may also be determined based on the amount of flow or the flow rate, e.g., even if the event is determined to be outdoor use if the flow rate surpasses typical flow rates for the event, the event may be determined to not be normal.

If the event is not normal, the method 500 may proceed to operation 506. In operation 506 an alert and/or event information is transmitted by the processing element 148 (e.g. the server 103) to the user device 112, 114. The alert and information may be transmitted in a number of different manners, such as, but not limited to, alerts in the user application, text message, emails, haptic responses (e.g., vibrations, tapping), or the like.

With reference to FIG. 18, after the event information is transferred to the user device 112, 114 or if the event is determined to be normal in operation 504, the method 500 may proceed to operation 508. In operation 508, the processing element 148 may determine whether the user is home. For example, the processing element 148 may review the user status or location that may be input or detected. In some embodiments, the user can set a home or away status on the user application to alert the system 100 as to whether the user is home (or in the same location as the flow detection hub 102, 202). In other embodiments, the system 100 may dynamically detect when a user is home or away based on assessment of the detected flow. For example, no indoor flow device usage during select hours may correspond to a user away status, which the flow detection hub 102 may automatically change or may present an option to a user to change the status. As another example, flow of certain devices regardless of the time may indicate that a user is home and the status may be updated automatically as well.

If the user is home, the method 500 may proceed t operation 512. In operation 512, the system 100 may determine whether to close the valve. The decision may be based on receiving information form the user, e.g., the user may provide an input to the system via the user application to indicate whether the valve 126 should be closed. If in operation 512, the valve 126 is to be closed, or if in operation 508 the user is not home, the method 500 may proceed to operation 514 and the flow detection hub 102, 202 will close the valve 126. By closing the valve either upon user instruction or in the instance the user is not home, the system 100 may help to prevent water damage due to a leak, device failure, or the like while the user is away.

If in operation 512, the user instructs the system 100 to not close the valve, the method 500 may proceed to end state 516. Similarly, after the valve has been closed in operation 514, the method 500 may proceed to an end state 516.

Some specific examples of abnormal flow conditions include high flow, low flow, temperature variations, and/or leak detections (e.g., constant flow and/or very low flow) will now be discussed. It should be noted that the below are merely illustrative and many other logic flows and alerts may be used. In one embodiment, if the flow detection hub 102, 202 detects high flow, i.e., flow rate over a predetermined threshold, the system 100 may determine if the user is home or away. If the user is home, the system 100 may text an alert to a user's device and close the valve based on a user's text response. If the user is not home, the system 100 may send an alert and automatically close the valve 126 without waiting for a response. This reduces the chance for damage if the user is unable to reply quickly (e.g., no network connection, in a meeting, or the like).

In another example, when a low flow condition is detected, the system 100 may determine whether the low flow has existing longer than a predetermined threshold (e.g., 10 minutes). If the low flow has not exceeded the predetermined threshold, the system 100 may wait and recheck the flow after a predetermined interval of time. If the low flow condition has existed longer than the predetermined threshold, the system 100 may transmit an alert to the user device 112, 114 and optionally may wait for the user's response or immediately close the valve 126.

In a third example, the system 100 may determine that the temperature has dropped below a predetermined level (e.g., below 5 degrees Celsius) or another threshold that indicates that the fluid may be freezing in the fluid supply pipe 104. In this example, the system 100 may automatically shut off the valve 126 and/or provide an alert to a user. Alternatively, the system 100 may determine whether the water has flowed in a recent time period (e.g., 12 hours). If the water has not been flowing, the system 100 may transmit an alert to a user regarding potential damage.

Finally, in a fourth example, the system 100 may detect a leak. In this example, the system 100 may transmit an alert t the user device 112, 115 and either upon confirmation from the user or immediately after transmitting the alert, may shut off the main valve 126.

CONCLUSION

The foregoing description has broad application. For example, while examples disclosed herein may focus on residential water systems, it should be appreciated that the concepts disclosed herein may equally apply to other water systems, such as commercial properties. Similarly, although the flow detection system is discussed with respect to water sources, the system and methods may be used with substantially any other type of fluid systems. Accordingly, the discussion of any embodiment is meant only to be exemplary and is not intended to suggest that the scope of the disclosure, including the claims, is limited to these examples.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary

What is claimed is:

1. A method for detecting flow events in a fluid supply system including multiple fluid consumption devices, comprising:

detecting by a flow detection hub a first change in flow rate through a fluid supply pipe, wherein the first change is an increase from a baseline flow rate to a first elevated flow rate;

detecting by a flow detection hub a second change in flow rate through the fluid supply pipe, wherein the second change is a decrease from the first elevated flow rate back to the baseline flow rate;

using one or more flow characteristics of the elevated flow rate through the fluid supply pipe to determine by a processing element that the first change and the second change correspond to a first event;

correlating by the processing element the first event with a first fluid consumption device in fluid communication with the fluid supply pipe to assign a flow signature for the fluid consumption device, wherein the flow signature allows the fluid consumption device to be identified by fluid flow through the first fluid supply pipe; and utilizing by the processing element the flow signature of the fluid consumption device to determine fluid usage of the first fluid consumption device during operation and transmit one or more messages to a user device regarding the fluid usage of the first fluid consumption device.

2. The method of claim 1, wherein correlating by the processing element further comprises evaluating environmental data corresponding to the fluid supply system.

3. The method of claim 2, wherein the environmental data comprises at least one of the following: a home status of the user, a time of day that the first change and the second change occurred, or a time of year that the first change and the second change occurred.

4. The method of claim 1, wherein the flow detection hub comprises:
at least one flow sensor for detecting a flow rate of fluid in the fluid supply pipe; and
a valve assembly fluidly connected to the fluid supply pipe and configured to prevent upstream flow of the fluid supply pipe.

5. The method of claim 4, wherein the flow detection hub further comprises a pressure sensor and a temperature sensor.

6. The method of claim 1, further comprising:
detecting by the flow detection hub a third change in flow rate, wherein the third change is an increase from the first elevated flow rate to a second elevated flow rate of fluid flow through the fluid supply pipe;
detecting by the flow detecting hub a fourth change in flow rate, wherein the fourth change is a decrease from the second elevated flow rate to the first elevated flow rate;
determining by the processing element that a rate of change of the third change in flow rate is the same as the fourth change in flow rate;
utilizing by the processing element a time period between the third change and the fourth change to determine a second event time for a second event, wherein the third change indicates a start of the second event and the fourth change indicates an end of the second event; and
correlating by the processing element the second event with a second fluid consumption device in fluid communication with the fluid supply pipe.

7. The method of claim 1, wherein determining by the processing element that the first change and the second change correspond to the first event comprises determining by the processing element that the first change and the second change are approximately the same rate of change of flow rate.

8. The method of claim 7, wherein correlating by the processing element the first event to the fluid consumption device comprises:
determining that the first change and the second change of the flow rate during the event matches a typical flow usage rate for the first fluid consumption device; and
determining that a time period between the first change and the second change corresponds to a typical usage time for the fluid consumption device.

9. The method of claim 7, wherein correlating by the processing element the first change and the second change correspond to the first event further comprises determining a first pressure data matches a second pressure data.

10. The method of claim 9, wherein the first and second pressure data comprise at least one of a frequency of a pressure signal and/or a slope of a pressure signal.

11. The method of claim 1, wherein determining by the processing element that the first change and the second change correspond to the first event comprises determining by the processing element that the first change and the second change have approximately the same magnitude of flow rate change relative to the baseline flow.

12. The method of claim 1, wherein correlating the processing element the first event with a fluid consumption device comprises:
comparing a time span between the first change and the second change and a flow rate change in both the first change and the second change to a known time span and a known flow rate change of one or more known flow events stored on a memory component in electrical communication with the processing element; and
determining that the time span and the flow rate change is with a predetermined threshold corresponding to a known flow event.

13. A method for detecting water flow events in a water supply system comprising:
detecting by a flow sensor a first flow delta from a baseline flow rate of water flow within a water pipe;
detecting by the flow sensor a second flow delta from the baseline flow rate of water flow within the water pipe;
linking by a processing element the first flow delta and the second flow delta based on:
the first flow delta and the second flow delta having a similar rate of change relative to the baseline flow rate; and
that the second flow delta occurred within a period of time after the first flow delta occurred;
determining by the processing element whether the linked first flow delta and the second flow data correspond to a predetermined water usage pattern of the first water using device;
when the linked first flow delta and second flow delta do not correspond to the predetermined water usage pattern, storing in a memory device the predetermined water usage pattern for the first water using device; and
when the linked first flow delta and second flow delta do not correspond to the predetermined water usage pattern:
generating by the processing element a new water usage pattern for a second water using device corresponding to the first flow delta and the second flow delta, the new water usage pattern comprising flow rate data and an event time corresponding to the period of time between the first flow delta and the second flow delta; and storing in the memory device the new water usage pattern for the second water using device; and utilizing by the processing element the predetermined water usage pattern and the new water usage pattern to transmit alerts to a user device regarding fluid consumption of one or more of the first water using device and the second water using device during operation of the first water using device and the second water using device, respectively.

14. The method of claim 13, further comprising:

detecting by the flow sensor a third delta over the baseline flow, wherein the third delta occurs at a time period between the first delta and the second delta;

detecting by the flow sensor a fourth delta over the baseline flow, wherein the fourth delta occurs at a time period after the third delta and before the second delta; and linking by the processing element the third flow delta and the fourth flow delta when a rate of change of the third delta is the same as a rate of change of the fourth delta;

determining by the processing element whether the linked third flow delta and fourth flow delta correspond to a predetermined water usage pattern of a third water using device;

when the linked third flow delta and fourth flow delta correspond to the predetermined water usage pattern, storing in a memory device the predetermined water usage pattern; and when the linked third flow delta and fourth flow delta do not correspond to the predetermined water usage pattern:

generating by the processing element a new water usage pattern for a fourth water using device corresponding to the third flow delta and fourth flow delta, the new water usage pattern comprising flow rate data and an event time corresponding to the period of time between the third flow delta and the fourth flow delta; and utilizing by the processing element the predetermined water usage pattern for the first water using device, the predetermined for the third water using device, the new water usage pattern for the second water using device, and the new water usage pattern for the fourth water using device to transmit alerts to a user device regarding fluid consumption of one or more of the first water using device, the second water using device, the third water using device, and the fourth water using device during operation of the first water using device, the second water using device, the third water using device, or the fourth water using device, respectively.

15. A method for detecting water flow in a water supply system for a building including multiple water using devices, the method comprising:

calibrating a flow detection hub to generate a flow signature for at least one of the multiple water using devices by:

detecting by a flow sensor in the flow detection hub a first delta and a second delta relative to a fluid flow through the flow detection hub;

evaluating by a processing element in electrical communication with the flow sensor, the first delta and second delta to determine that the first delta and second delta correspond to a first event, wherein the evaluation comprises:

determining that the first delta is an increase in flow rate and the second delta is a decrease in flow rate; and a change rate of the first delta is the same as a change rate of the second delta; and generating by the processing element a first flow signature for a first water using device, the first flow signature comprising:

an event length based on a time length between the first delta and the second delta; and a flow change rate corresponding to the change rate of the first delta and the second delta;

storing the first flow signature in a memory component in electrical communication with the processing element;

after calibration of the flow detection hub, detecting by the flow detection hub a flow event based on one or more changes in a fluid flow rate through the flow detection hub;

determining by the processing element whether the flow event is an expected flow event by comparing characteristics of the flow event with the first event stored in the memory component to determine if the flow event substantially matches the first event; and when the flow event is not an expected flow event, transmitting by the processing element an alert to a user device; and when the flow event is an expected flow event, optionally storing data corresponding to the flow event in the memory device.

16. The method of claim 15, wherein determining by the processing element whether the flow event is an expected flow event, further comprises comparing an event flow rate with a threshold flow rate and if the event flow rate is higher than the threshold flow rate, determining that the flow event is not expected.

17. The method of claim 15, wherein when the flow event is not an expected flow event, further determining by the processing element whether a user is in the building by analyzing a home status of the user device and/or an assessment of water flow through the flow detection hub.

18. The method of claim 17, wherein when the user is not in the building, closing a water valve within the fluid detection hub to stop water flow to the multiple water using devices.

* * * * *

UNITED STATES PATENT AND TRADEMARK OFFICE
CERTIFICATE OF CORRECTION

PATENT NO. : 9,928,724 B2  
APPLICATION NO. : 15/153115  
DATED : March 27, 2018  
INVENTOR(S) : Bradley Wilson Alcorn et al.

Page 1 of 1

It is certified that error appears in the above-identified patent and that said Letters Patent is hereby corrected as shown below:

In the Claims

| | Reads | Should read |
|---|---|---|
| Column 24, Line 54 Claim 13: | "second flow data" | --second flow delta-- |
| Column 24, Line 55-56 Claim 13: | "the first water using device" | --a first water using device-- |
| Column 24, Line 57-58 Claim 13: | "flow delta do not correspond" | --flow delta correspond -- |

Signed and Sealed this  
Twenty-eighth Day of September, 2021

Drew Hirshfeld  
*Performing the Functions and Duties of the*  
*Under Secretary of Commerce for Intellectual Property and*  
*Director of the United States Patent and Trademark Office*